United States Patent [19]
Ghahramani

[11] Patent Number: 5,724,262
[45] Date of Patent: Mar. 3, 1998

[54] METHOD FOR MEASURING THE USABILITY OF A SYSTEM AND FOR TASK ANALYSIS AND RE-ENGINEERING

[75] Inventor: Bahador Ghahramani, Long Valley, N.J.

[73] Assignee: Paradyne Corporation, Largo, Fla.

[21] Appl. No.: 320,810

[22] Filed: Oct. 11, 1994

Related U.S. Application Data

[63] Continuation-in-part of Ser. No. 251,079, May 31, 1994, abandoned.

[51] Int. Cl.$^6$ .................................................. G09B 7/00
[52] U.S. Cl. ...................... 364/551.01; 364/468.18; 395/207; 395/210; 395/211; 434/322; 434/350; 434/362
[58] Field of Search .................... 364/419.2, 551.01, 364/554, 468.18; 395/207, 211, 201, 210; 434/350, 236, 322, 323, 362, 363

[56] References Cited

U.S. PATENT DOCUMENTS

| | | | |
|---|---|---|---|
| 4,583,280 | 4/1986 | Corrigan et al. | 364/468.18 |
| 4,627,818 | 12/1986 | Von Fellenberg | 434/236 |
| 4,671,772 | 6/1987 | Slade et al. | 434/236 |
| 4,937,439 | 6/1990 | Wanniger et al. | 235/456 |
| 5,041,972 | 8/1991 | Frost | 364/401 |
| 5,084,819 | 1/1992 | Dewey et al. | 364/419.2 |
| 5,086,393 | 2/1992 | Kerr et al. | 364/419.2 |
| 5,124,911 | 6/1992 | Sack | 395/210 |
| 5,212,635 | 5/1993 | Ferriter | 395/211 |
| 5,365,425 | 11/1994 | Torma et al. | 395/211 |
| 5,496,175 | 3/1996 | Oyama et al. | 434/323 |
| 5,500,795 | 3/1996 | Powers et al. | 395/211 |
| 5,523,960 | 6/1996 | Jeong | 395/211 |
| 5,526,257 | 6/1996 | Lerner | 395/210 |

OTHER PUBLICATIONS

Designing Minimal Documentation Using a GOMS Model: A Usability Evaluation of an Engineering Approach, Gong et al., Sigchi Bulletin, Proc. of the CHI'90, Apr. 1990, ISSN 0736–6906, pp. 99–106.

Measuring System Usability, R. Rengger, Proceedings of the 8th International Conference on Systems Engineering, 1991, pp. 713–720.

(List continued on next page.)

*Primary Examiner*—Ellis B. Ramirez
*Assistant Examiner*—Eric W. Stamber
*Attorney, Agent, or Firm*—Thomas, Kayden, Horstemeyer & Risley

[57] ABSTRACT

A method for quantitatively and objectively measuring the usability of a system. The method provides quantitative measures for usability satisfaction, usability performance, and usability performance indicators. Usability satisfaction is measured by acquiring data from a system user population with respect to a set of critical factors that are identified for the system. Usability performance is measured by acquiring data for quantifying the statistical significance of the difference in the mean time for an Expert population to perform a task on a particular number of trials and the estimated mean time for a Novice population to perform the task on the same number of trials. The estimated mean time is calculated according to the Power Law of Practice. Usability Performance Indicators include Goal Achievement Indicators, Work Rate Usability Indicators, and Operability Indicators which are calculated according to one or more measurable parameters which include performance times, numbers of problems encountered, number of actions taken, time apportioned to problems, learning time, number of calls for assistance, and the number of unsolved problems. A task analysis and re-engineering methodology statistically compares quantitative usability measurements according to various classified subsets of the overall population. Such subsets or categories include population, critical factors, a critical factor, vital critical factors, other demographic groups, etc. Preferably, such subsets are set forth in a hierarchical manner such that the statistical comparison identifies a root task characteristic for re-engineering. Task analysis and re-engineering may also be performed according to activity on arrows, and activity in nodes techniques.

19 Claims, 14 Drawing Sheets

OTHER PUBLICATIONS

Evaluating the Usability of Application Interfaces, C. Schneier, Proceedings of the International Conference on Systems, Man, Cybernetics, Oct. 1986 IEEE, vol. 1, pp. 444–447.

Learning and Stability, G. Snoddy, Journal of Applied Psychology, vol. X, No. 1, 1926, pp. 1–36.

An Empirical Study of the Factors Which Affect User Satisfaction in Hospitals, Bailey et al., Industrial and Management Systems Engineering, Arizona State University, 1988.

Systems Usability Measurements Methodology, Ghahramani et al., Advances in Industrial Ergonomics and Safety V, Jul. 1993, pp. 133–140.

The Measurement of Meaning, Osgood et al., University of Illinois Press, 1967, pp. 25–30.

Measurement and Meaning of Job Satisfaction, Wanous et al., Journal of Applied Psychology, 1972, vol. 56, No. 2, pp. 95–105.

Friedman, "The Effects of Positive and Negative Wording on Response to a Likert Scale", Applied Marketing Research, vol. 28, Iss. 2, Fall 1988, pp. 17–22.

Flohrer, "Human Factors—Design of Usability", IEEE Proceedings: VLSI and Computer Peripherals, VLSI and Microelectronic Applications in Intelligent Peripherals and their Interconnection Networks, May 1989, pp. 2–108 to 2–113.

LaLomia et al., "Measurement of Computer Satisfaction, Literacy, and Aptitudes: A Review", International Journal of Human–Computer Interaction, vol. 2, No. 3, 1990, pp. 231–253.

Chin et al., "An Examination of the Relative Importance of Four Belief Constructs on the GSS Adoption Decision: A Comparison of Four Methods", IEEE 1993 Proceedings of the Intnl. Conf. on Systems Sciences, vol. 4, pp. 548–557.

Rao et al., "Towards a Texture Naming System: Identifying Relevant Dimensions of Texture", IEEE 1993 Proceedings Visualization, pp. 220–227.

Eberts, *User Interface Design*, 1994 Prentice–Hall Inc., pp. 61–81.

Dr. S. Vajda, *Readings in Linear Programming*, John Wiley & Sons Inc., 1958, pp. 1–2 and 25–33.

Jensen et al., *Network Flow Programming*, John Wiley & Sons, 1980, pp. 1–10, 59–87, and 339–390.

FIG. 2

```
SYSTEM'S OUTPUT TIMELINESS:
NOT APPLICABLE_
                   1 2 3 4 5 6 7
          SLOW    O O O O O O O    FAST
   UNREASONABLE   O O O O O O O    REASONABLE
```

FIG. 3

```
SYSTEM'S OUTPUT TIMELINESS:

1 2 3 4 5 6 7
   INSIGNIFICANT   O O O O O O O    SIGNIFICANT
```

FIG. 4

| CATEGORIES | CODES (J) | FACTORS |
|---|---|---|
| VISUAL CLARITY SCREENS: | 1 | SCREEN APPEARANCE |
| | 2 | LAYOUT OF INFORMATION |
| | 3 | USE OF COLOR* |
| | 4 | USE OF HIGHLIGHTING* |
| FUNCTIONALITY OF SOFTWARE: | 5 | SCREEN ORGANIZATION |
| | 6 | SOFTWARE EFFECTIVENESS |
| | 7 | TASK ALLOCATION |
| | 8 | SOFTWARE FLEXIBILITY |
| | 9 | SYSTEM SPEED |
| | 10 | SYSTEM RELIABILITY |
| EASE OF USE OF SOFTWARE: | 11 | USE OF COMMANDS |
| | 12 | FAMILIARITY OF TERMINOLOGY |
| | 13 | TERMINOLOGY THROUGHOUT THE SYSTEM |
| | 14 | ICON RELEVANCE* |
| | 15 | ERROR RECOVERY |
| | 16 | FEEDBACK |
| | 17 | LOCATION ACCESS |
| | 18 | DEMAND ON MEMORY |
| SYSTEM MESSAGES AND HELP: | 19 | MESSAGES TO RECOVER FROM ERRORS |
| | 20 | MESSAGES TO PREVENT DELETION/ERRORS |
| | 21 | SYSTEM INSTRUCTIONS |
| | 22 | USER GUIDE* |
| | 23 | HYPERTEXT* |
| | 24 | JOB AID (S)* |
| SYSTEM TRAINING: | 25 | TRAINING GUIDE* |
| | 26 | INSTRUCTOR* |
| | 27 | COMPUTER-BASED TRAINING* |
| SYSTEM OUTPUT: | 28 | COMPLETENESS |
| | 29 | LAYOUT |
| | 30 | TIMELINESS |
| WORK ENVIRONMENT: | 31 | KEYBOARD DESIGN |
| | 32 | WORKSTATION SET-UP |
| | 33 | MOVEMENT RESTRICTION |
| | 34 | FATIGUE |
| | 35 | SOUND DISTRACTION |
| | 36 | EYE STRAIN |

*SYSTEM SPECIFIC

FIG. 6

| POPULATION GROUPS | MIN. | AVE. | MAX. | RANGE |
|---|---|---|---|---|
| DISTRICT 1 | XX | XX | XX | XX |
| DISTRICT 2 | XX | XX | XX | XX |
| ⋮ | ⋮ | ⋮ | ⋮ | ⋮ |
| DISTRICT 9 | XX | XX | XX | XX |

FIG. 7

| CRITICAL FACTOR CATEGORY | MINIMUM RANGE -2.35 TO -∞ (POPULATION I) | AVERAGE 5.0 POPULATION (I) | MAXIMUM RANGE 12.35 TO ∞ (POPULATION I) | RANGE | RANK |
|---|---|---|---|---|---|
| VISUAL CLARITY | -4.6 | 5.0 | 14.6 | 19.2 | 3 |
| FUNCTIONALITY | -5.7 | 8 | 21.7 | 27.4 | 2 |
| EASE OF USE | 2.9 | 6 | 9.1 | 12 | 5 |
| MESSAGES | 0 | 5 | 10 | 10 | 7 |
| TRAINING | 2.1 | 7 | 11.9 | 14 | 4 |
| OUTPUT | -6.7 | 9 | 24.7 | 31.4 | 1 |
| ENVIRONMENT | -1.3 | 4 | 9.3 | 10.6 | 6 |

FIG. 8

| CATEGORY FACTORS | MIN. | AVE. | MAX. | RANGE |
|---|---|---|---|---|
| SCREEN APPEAR. | XX | XX | XX | XX |
| LAYOUT OF INF. | XX | XX | XX | XX |
| USE OF COLOR | XX | XX | XX | XX |
| USE OF HIGHL. | XX | XX | XX | XX |

FIG. 9

| VITAL FACTORS | MIN. | AVE. | MAX. | RANGE |
|---|---|---|---|---|
| SYS. SPEED | XX | XX | XX | XX |
| ERROR RECOV. | XX | XX | XX | XX |
| HYPERTEXT | XX | XX | XX | XX |
| EYE STRAIN | XX | XX | XX | XX |

FIG. 10

| REGIONS | MIN. | AVE. | MAX. | RANGE |
|---------|------|------|------|-------|
| EASTERN | XX | XX | XX | XX |
| CENTRAL | XX | XX | XX | XX |
| WESTERN | XX | XX | XX | XX |

FIG. 11

| CATEGORY FACTORS | MIN. | AVE. | MAX. | RANGE |
|------------------|------|------|------|-------|
| TRAINING GUIDE | XX | XX | XX | XX |
| INSTRUCTOR | XX | XX | XX | XX |
| COM. BASED TR. | XX | XX | XX | XX |

FIG. 12

| VITAL FACTORS | MIN. | AVE. | MAX. | RANGE |
| --- | --- | --- | --- | --- |
| LAYOUT OF INF. | XX | XX | XX | XX |
| ORG. OF SCR. | XX | XX | XX | XX |
| SPEED OF SYS. | XX | XX | XX | XX |
| USE OF COMMANDS | XX | XX | XX | XX |
| APP. FEEDBACK | XX | XX | XX | XX |
| USER GUIDE | XX | XX | XX | XX |
| HYPERTEXT | XX | XX | XX | XX |

FIG. 13

| DEMOGRAPHIC GROUP | MIN. | AVE. | MAX. | RANGE |
| --- | --- | --- | --- | --- |
| HIGH SCHOOL | XX | XX | XX | XX |
| BACHELOR DEG. | XX | XX | XX | XX |
| MASTERS DEG. | XX | XX | XX | XX |
| DOCTORATE | XX | XX | XX | XX |

FIG. 14

| POPULATION GROUP | MIN. | AVE. | MAX. | RANGE |
| --- | --- | --- | --- | --- |
| PROJECT 1 | xx | xx | xx | xx |
| PROJECT 2 | xx | xx | xx | xx |
| PROJECT 3 | xx | xx | xx | xx |
| PROJECT 4 | xx | xx | xx | xx |

FIG. 15

| NOVICE USER | $S(i)$ MIN. | $N(i)$ ITEM | $A(i)$ MIN./ITEM | $T(i,1)$ MIN. |
| --- | --- | --- | --- | --- |
| 1 | 5 | 3 | 6 | 23 |
| 2 | 6 | 4 | 5 | 26 |
| 3 | 5 | 4 | 4 | 21 |
| 4 | 7 | 4 | 5 | 27 |
| 5 | 6 | 3 | 4 | 18 |
| 6 | 5 | 4 | 6 | 29 |
| | TOTAL | | | 144 |

$$\overline{T(i,1)} = \frac{144}{6}$$

OR $$\overline{T(i,1)} = 24 \text{ MINUTES}$$

FIG. 16

| POPULATION GROUP | MIN. | AVE. | MAX. |
|---|---|---|---|
| HIGH SCHOOL | XX | XX | XX |
| ASSOCIATE DEG. | XX | XX | XX |
| COLLEGE DEG. | XX | XX | XX |
| MASTERS | XX | XX | XX |
| DOCTORATE | XX | XX | XX |

FIG. 17

| MEASUREMENT | MIN. | AVE. | MAX. | RANGE |
|---|---|---|---|---|
| $U(i)$: | | | | |
| POPULATION | .. | .. | .. | .. |
| CRITICAL FACTORS | .. | .. | .. | .. |
| A CRITICAL FACTOR | .. | .. | .. | .. |
| VITAL CRIT. FACTORS | .. | .. | .. | .. |
| $U(i)$: | | | | |
| POPULATION | .. | .. | .. | .. |
| CRITICAL FACTORS | .. | .. | .. | .. |
| A CRITICAL FACTOR | .. | .. | .. | .. |
| VITAL CRIT. FACTORS | .. | .. | .. | .. |
| $A(i)$: | | | | |
| POPULATION | .. | .. | .. | .. |
| $T(i, 1)$: | | | | |
| POPULATION | .. | .. | .. | .. |

FIG. 18

| INDICATOR | MIN. | AVE. | MAX. |
|---|---|---|---|
| GOAL ACH. | | | |
| NE | .. | .. | .. |
| EE | .. | .. | .. |
| WORK RATE | | | |
| RE | .. | .. | .. |
| PP | .. | .. | .. |
| PT | .. | .. | .. |
| OPERABILITY | | | |
| RT | .. | .. | .. |
| RU | .. | .. | .. |
| RL | .. | .. | .. |
| CF | .. | .. | .. |

FIG. 19

| FACTOR | AVE. RATE | PRIORITY | TASK(S) IMPACTED | RECOMM- ENDATIONS |
|---|---|---|---|---|
| XX | XX | XX | XX | XX |
| XX | XX | XX | XX | XX |
| XX | XX | XX | XX | XX |

| PATH    | COMPUTATION | TIME | CP | CT |
|---------|-------------|------|----|----|
| A-D-I   | 4+6+3       | 13   |    |    |
| A-E-F-I | 4+2+7+3     | 16   |    |    |
| A-E-G-J | 4+2+6+5     | 17   |    |    |
| B-F-I   | 3+7+3       | 13   |    |    |
| B-G-J   | 3+6+5       | 14   |    |    |
| C-H-J   | 8+7+5       | 20   | CP | CT |
| C-K     | 8+4         | 12   |    |    |

METHOD FOR MEASURING THE USABILITY OF A SYSTEM AND FOR TASK ANALYSIS AND RE-ENGINEERING

CROSS-REFERENCES TO RELATED APPLICATIONS

This application is continuation-in-part of U.S. application Ser. No. 08/251,079, filed May 31, 1994, now abandoned.

FIELD OF THE INVENTION

The present invention relates generally to engineering, ergonomics, reliability, and information systems, and more particularly, to a quantitative method for measuring the s usability of a system or product, and to a quantitative method for task analysis and re-engineering.

BACKGROUND OF THE INVENTION

Customers determine the quality of a system. Typically quality is thought of in terms of well built, long-lasting, or defect free. While these are critical components of quality, it is important to realize that if a customer considers a product difficult to use, the customer is not likely to use it enough to find out how well built it is. In instances where customers are internal, and may not have the choice of using a system or not, there are still many reasons for making the system as usable as possible. A term that is often used to describe the quality of a product from the user's perspective, and is especially common with respect to computer products, is the term "user friendly."

A broader term that may be used to describe a system or product is "usability." A usability method, as defined herein, is a method for quantifying user interaction with a system. Typically, the terms "user friendliness," "ease of use" and "ease of learning" are used to qualitatively describe usability; however, it is emphasized that usability, as used herein, is based in quantitative and objective measurement. Usability, then, refers to a comprehensive, quantitative, and objective assessment of all the aspects of system or product performance measurements that can determine and represent how well a product performs for users.

Heretofore, there has been no quantitative and objective method for measuring the usability of a system. For instance, with many software products, (e.g., such as different word processing programs), the "user friendliness" is described in terms of the "look and feel" of the user interface, the "intuitiveness" of performing certain functions, the logical organization of pull-down menus, etc. In contrast, quantitative "benchmark" tests are used to measure processing power; for example, by measuring the time to complete various tasks using different software products (e.g., word processing, graphics, spreadsheets, databases) that emphasize different processing functions (e.g., floating point operations, integer operations, etc.). These benchmark tests, however, focus on processing, power, and not on usability. A further example of such prior art attempts at assessing usability is the use of psychological "one-way mirror" observations of user interaction with a developed product or system. Moreover, techniques for assessing a system have been applied only after a system has been developed or put into the field. Clearly, it would be efficacious to provide quantitative and objective usability measurements before and during product development—not only after completion.

Such a usability method should provide many new and useful means for enhancing usability itself, and "high" usability translates directly into cost, quality, performance, and satisfaction benefits. Of course, there is a perception that quality always costs more. In fact, while producing a quality product may require additional investments initially, invariably costs are reduced over the long term. Usability improvements quickly lead to cost savings in several key areas. Improvements resulting from usability measurements will help increase customer and user satisfaction, reduce errors, and increase user productivity. Simply stated, many cost, quality, and satisfaction benefits can be expected by performing usability assessment, and making product modifications to improve areas of weakness.

With respect to cost, testing a system's usability in the prototype stage highlights areas requiring improvement prior to full scale development. Fewer resources are required to make improvements during the prototype stage than further along in the development cycle. Also, quantitative and objective measurements of usability are more efficiently translated into re-engineering efforts by engineers and, designers, in contrast to the necessarily more vague qualitative analyses (e.g., psychological studies). In addition, highly usable products are much more intuitive, and therefore require a lower investment in training development and delivery. Operators of usable systems will become experts more quickly than with difficult to use systems. Further, critical and frequently performed tasks are given extra attention during usability testing to ensure that errors are as low as possible, and that the tasks are performed as efficiently as possible. Moreover, a quantitative measurement of efficiency of use can determine areas where user interaction with a system should be made more efficient.

With respect to quality, usability testing isolates error prone tasks and activities so that they can be improved. Based on usability measurements, Human Factors Engineering techniques can be used to focus on error prevention techniques in addition to the standard methods of error detection. In addition, usability tests track the ability of system users to remember and process particular commands. By reducing the need for users to memorize and process information to perform particular functions, overall errors are reduced. Moreover, systems which are highly consistent and compatible with existing products allow users to transfer skills they have already developed to perform system functions and solve problems. Compatible systems operate according, to the same rules as other familiar systems. Operation of the system should also feel natural to users.

Concomitant with cost and quality benefits, customer satisfaction is increased as well by reducing errors, reducing cost, and increasing user productivity. Moreover, system user satisfaction is increased by making the system easier to use, making ergonomic improvements, increasing system flexibility to meet varying user needs and user preference, and making the system more enjoyable to use.

Increasing a system's usability will lower cost by reducing errors and reducing required training time, and will increase efficiency, productivity, quality and user satisfaction. Usability measurement provides a process for objectively and quantitatively measuring the usability of existing systems, and to assist possible reengineering efforts.

Heretofore, there has been no quantitative and objective method for task analysis and re-engineering efforts. A reason for this void is due, in part, to the lack of quantitative and objective methods for mesuring usability. More specifically, while many prior art task analysis studies are documented, none are quantitative, none are developed to supplement a usability model, and none can improve a system's usability.

It is understood then, that a quantitative and objective usability methodology has potentially vast utility. Nevertheless, the prior art is devoid of a usability method that provides objective and quantitative information that may be used to exploit such potential, and articularly, may be used as a basis for task analysis and re-engineering. Further, the prior art is devoid of any quantitative and objective task analysis and re-engineering method.

SUMMARY OF THE INVENTION

The present invention overcomes the above, and other, limitations of prior art usability techniques by providing a usability method that provides objective and quantitative measurement of a system, and thus provides many features and advantages heretofore unrealizable. In an embodiment of the usability method according to the present invention, three methods for measuring and quantifying usability are included: a Usability Satisfaction Method, a Usability Performance Method, and a Usability Performance Indicators Method.

Measuring usability satisfaction includes: identifying critical factors, developing a survey with respect to the critical factors, each critical factor associated with at least one bipolar adjective pair, each bipolar adjective pair associated with a range of numerical values; acquiring user responses to the survey; and calculating usability satisfaction values according to critical factors and to users. For instance, an individual user's overall satisfaction may be represented as a weighted sum over all critical factors. Further, individual user's overall satisfaction may be averaged over all users, thus providing an average overall satisfaction. Alternatively, usability satisfaction for a particular critical factor may be quantified. That is, each user's satisfaction for a given critical factor may be averaged over all users.

Measuring usability performance includes: measuring the time for each member of a population of Experts to perform a task for each of a plurality of trials; measuring the time for a population of Novices that perform the same task; comparing the mean time for the population of Novices to the mean time for the population of Experts for a predetermined trial number in order to obtain a statistical index indicative of the significance of the difference between the means. In accordance with a preferred embodiment of the present invention, applying the Power Law of Practice enables measuring the Novice population performance time for only a first trial and estimating the mean performance time for the Novice users for a predetermined subsequent trial number. Preferably, the predetermined trial number corresponds to a trial number for which the Expert population performance time is measured.

The methodology for providing performance indicators includes generating Goal Achievement Indicators, Work Rate Usability Indicators, and Operability Indicators according to measurable parameters including performance times, numbers of problems encountered, number of actions taken, time apportioned to problems, learning time, number of calls for assistance, and the number of unsolved problems.

The present invention also provides a quantitative and objective method for task analysis and re-engineering After a system's usability is objectively and quantitatively measured, the task analysis and re-engineering method is performed. The task analysis and re-engineering methodology statistically compares quantitative usability measurements according, to various classified subsets of the overall population. Such subsets or categories include population, critical factors, a critical factor, vital critical factors, other demographic groups, etc. Preferably, such subsets are set forth in a hierarchical manner such that the statistical comparison identifies a root task characteristic for re-engineering. The Task Analysis and Re-engineering Method of the present invention is preferably based on each of the methods included in the usability model, including the Usability Satisfaction Method, the Usability Performance Method, and the Usability Performance Indicators Method. Task analysis and re-engineering may also be performed according to activity on arrows, and activity in nodes techniques.

Many features and advantages of the present invention will become apparent by practicing, the invention.

A feature of the usability model is that it is quantitative in nature, a departure from existing usability measurements methodologies which are qualitative. The mathematical methods incorporated into the usability model provide a consistent method for quantifying results collected from survey and test results.

Another feature of the present invention is that it provides a consistent and repeatable measurement of usability. Users with similar skills, training and background pertaining to a specific system should measure usability of the system similarly using the model. The results should be identical, independent of the time of test. Simply stated, similar users should come up with similar usability results for the same system, and their answers should be identical to measurements taken at various time intervals.

Yet another feature of the Usability Model is that it provides cost effectiveness. The Usability Model can be viewed as a measurement that identifies resources deployed to make a system work. The model provides specific information that will help analysts increase the quality of the outputs (benefits) or reduce the resources (costs) needed to deploy. The benefits are based on a continuum from resource reduction to work enhancement. The model also highlights the means to achieve higher productivity from existing resources. Thus, a group of system users can be expected to produce more outputs when usability of a system is improved.

Yet a further feature of the present invention is that it can be used across platforms. By adjusting the critical factors, and selecting appropriate tasks, the model can be adapted to assess the usability of any product. This entails hardware, software and environment.

Still another feature of the present invention is that the usability method produces consistent results which are easy to validate by comparing different tests.

Still a further aspect of the present invention is that it is adaptable; any aspect of a system can be addressed by including critical factors relevant to that aspect. Adjustable critical factors allow the usability model to provide the flexibility and coverage required by teams testing a system's usability. The usability model highlights the problem areas of a system, and produces results which will help define corrective measures to be taken.

A further feature of the present invention is that problem areas of a system may be identified according, to an objective and quantitative Task Analysis and Reengineering Method.

A related feature is that the Task Analysis and Re-engineering Method of the present invention identifies problem areas according to a hierarchical methodology.

These and other features and advantages will be apparent from the following description, together with the accompanying drawings and appended claims, as well as from practicing the invention accordingly.

BRIEF DESCRIPTION OF THE DRAWINGS

The invention will be described in greater detail below by way of reference to the accompanying drawings, wherein:

FIG. 2 illustrates two bipolar adjective pairs for a critical factor for an information system, in accordance with the present invention;

FIG. 3 illustrates an example of a significance scale for a critical factor in order to assist acquiring significance information, in accordance with the present invention;

FIG. 4 illustrates thirty-six possible critical factors, subdivided by category, for a management information system, in accordance with an embodiment of the present invention;

FIGS. 6–16 illustrate tables that may be constructed in accordance with practicing the Task Analysis and Re-engineering Method of the present invention.

FIG. 17 is an example of a form presenting results of usability for the Task Analysis and Re-engineering Method of the present invention;

FIG. 18 is an example of a form presenting results of task indicators for the Task Analysis and Re-engineering Method of the present invention;

FIG. 19 illustrates a sample presentation of critical factor analysis according, to the Task Analysis and Re-engineering Method of the present invention;

FIG. 24 shows a table corresponding to the paths associated with the example of FIG. 23, in accordance with the Task Analysis and Re-engineering Method of the present invention.

DETAILED DESCRIPTION OF THE PREFERRED EMBODIMENT

Figure 1:
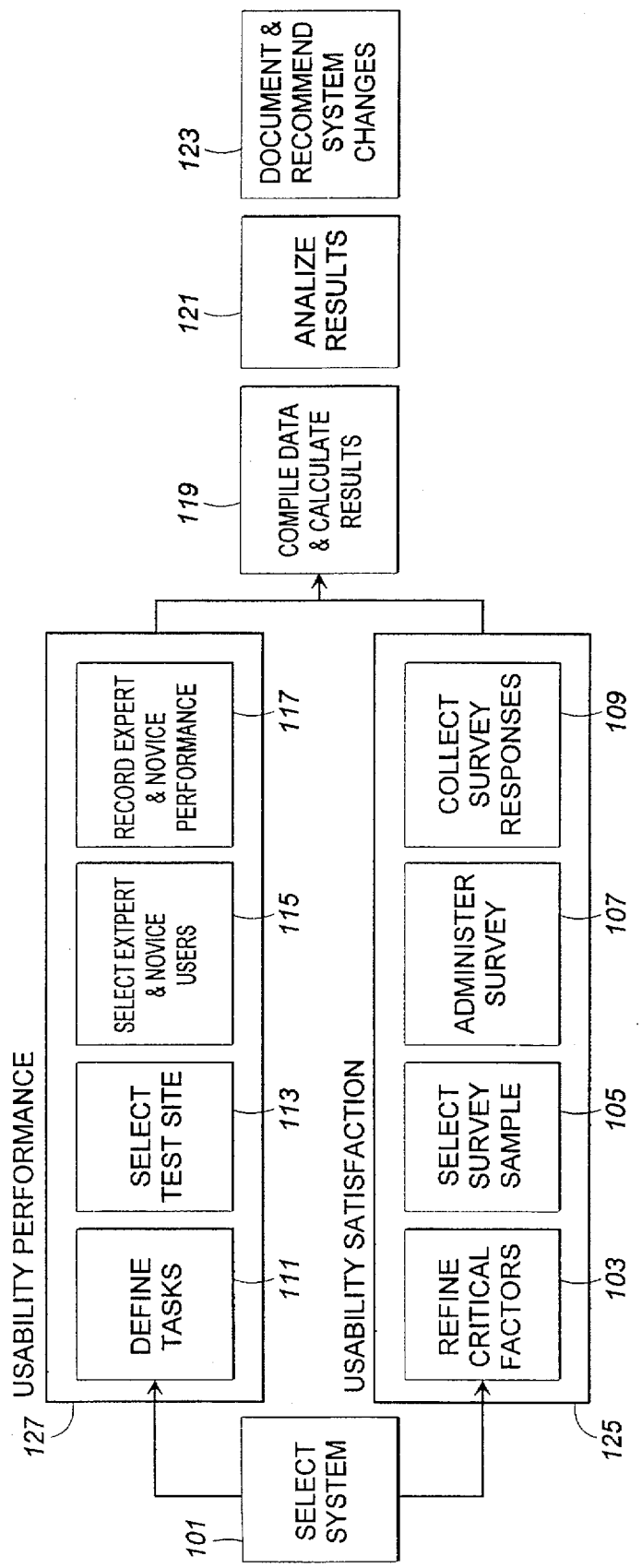
FIG. 1 shows a flowchart for implementing the usability model in accordance with the present invention.

The usability measurement method of the present invention (hereinafter "usability model" or "usability method") provides a means of quantitatively measuring product or service systems with respect to user satisfaction and performance. When applied, the methods of the usability model produce output which point out areas needing improvement, and user desired features that should be added. Applications for this model are broad and particularly effective in the area of products and services, e.g., manufacturing, marketing, finance, product development, and information systems. The task analysis and re-engineering methodology is implemented on a computer system by using computer programs.

The present invention, therefore, will benefit the design, development and operation of present or future products and services systems. Although the focus of the examples herein described are primarily on information systems, the model is applicable for all types of systems. As used herein, the terms "system" and "product" are used to represent any entity that would benefit from the usability model of the present invention. A system is a product or service of any type that a customer or client will use. It does not strictly refer to computer or information systems. A system or product may be intended for either external or internal customers.

It is imperative to emphasize that the usability model of the present invention is applicable for measuring the usability of all types of systems: computer, as well as any other initiative that produces products or services. The usability of any product can be measured using the usability model. The usability model incorporates users' perceptions of a system and their experiences with its operation. It addresses all aspects of existing systems, including hardware, software, and environment. Usability measurement is more interested in user satisfaction with a system rather than evaluation of its design and development specifications, e.g., Systems Engineering, Electrical & Electronics Engineering, Mechanical Engineering, etc.

Generally, the usability of a system is a combination of its social acceptability and application acceptability. The usability model emphasizes evaluation of the application acceptability of a system. Application acceptability is directly related to factors such as reliability, timeliness, and usefulness.

In accordance with a preferred embodiment of the present invention, the usability model may be viewed as consisting of three methods: a Usability Satisfaction Method, a Usability Performance Method, and a Usability Performance Indicators Method. These three methods supplement each other, providing a thorough assessment of usability from the user's perspective. It will be further understood, however, that the usability model of the present invention may be subject to many variations without changing the scope of the invention or diminishing its attendant advantages. One of these variations, is that the usability model may, for example, not necessarily include the Usability Performance Indicators Method; nevertheless, the usability model will provide numerous features and advantages.

The ensuing methodology overview further describes each method, which are then described in further detail. Any cited references are hereby incorporated by reference. In addition, in connection with the detailed description examples are presented to illustrate features and characteristics of the present invention, and to elucidate implementation of the usability model; such examples are not to be construed as limiting the invention thereto. Also, it is noted that although the methodology is broadly applicable to myriad systems, in an embodiment of the present invention in which a system is an information system (e.g., based on a computing system), all acquisition of data may occur via the information system, including measurement of time intervals, number of steps completed, etc., as will be further understood herein below. The implementing computer system allows for the input and output of data on devices apparent to those skilled in the art.

METHODOLOGY

To assess a system's usability satisfaction, a set of critical factors are defined. Critical factors are those components which influence a user's ability to efficiently and effectively operate a system. Once defined, the factors are used to develop a survey which is to be completed by system users.

Usability satisfaction measurement is the weighted sum of an individual's perception or attitude toward all critical factors influencing a particular task or job function (Wanous J., and Lawler E., 1972, Measurement and Meaning of Job Satisfaction. *Journal of Applied Psychology*, 56:95–105). The results of the survey are used to calculate usability satisfaction by critical factor(s) and by user(s).

As an example, suggested critical factors for a simple computer system have been separated into five categories, including: the visual clarity of screens, the functionality of software, the case of use of software, the system training, and the system messages and help.

It is important to note that different products have to be tested based on their own unique set of critical factors. Since a product is considered unique and evaluated apart from other products, a set of critical factors applicable to one will vary from the sets of critical factors applied to other products.

The Usability Performance Method is based on the ergonomics of Human Machine System principles. These principles analyze the Perceptual, Cognitive and Motor Skills of an individual operating a system. In this model a series of tasks are selected for testing. A task is defined as either a single operation (e.g., using a function key F I, or Alt), or a series of operations. The model enables quantitative measurement of the usability of a system based on the time required to perform selected tasks. Preferably, the Usability Performance Method applies what is known as the Power Law of Practice method (Snoddy, G. S., 1926, Learning and Stability, *Journal of Applied Psychology*, 10, 1–36), and statistical analysis to produce an overall index of performance usability that is objective and does not rely on measuring a learning curve.

A Usability Performance Indicators Method or model is used to quantify system performance in several key areas. Preferably, this Usability Performance Indicators Method provides usability performance indicators directed to different aspects and issues in usability, and includes: Goal Achievement Usability Indicators, Work Rate Usability Indicators, and Operability Indicators. These indicators primarily measure the level of system users performance, e.g., effectiveness, efficiency, productivity, ability, willingness.

More particularly, Goal Achievement Usability Indicators measure the degree of success with which systems users perform their tasks and reach their goals. They measure the effectiveness of users operating systems and achieving their objectives. In contrast, Work Rate Usability Indicators measure the rate at which system users perform to reach their objectives. They measure the efficiency and productivity of users operating to perform their tasks. Operability Indicators measure the ability of system users to utilize the system features. They measure the capabilities of systems users in making use of their experience, tools, and features to solve their systems problems. They also measure the level of problems users encounter while performing their jobs.

Applying the usability model involves gathering users' perceptions of a system, and conducting performance tests using a selected set of tasks. Referring to FIG. 1, the primary steps involved in applying the usability model of the present invention may be outlined.

First, in step 101, a system is selected. As discussed herein above, a "system" is not limited to computer systems, but broadly spans any product, system, service, or any facility with which a user interacts to accomplish a goal or a task in accordance with means provided by the system.

Once a system is selected, in order to apply the Usability Satisfaction Method, a usability satisfaction information acquisition sequence 125 is performed, the first step 103 of which includes, as described herein above, defining and refining a set of critical factors and a survey based on the critical factors. Then, users to be surveyed are selected and the survey is administered in step 105 and step 107, respectively, followed by collection of the survey responses in step 109.

In order to apply the Usability Performance Method, a usability performance data acquisition sequence 127 is performed. First, a set of tasks must be defined (step 111). Then, in step 113, an appropriate test site is selected according to the task requirements and to the desired experimental conditions. The Usability Performance Method of the present invention uses both Expert and Novice users, who are selected in step 115. For purposes of the Usability Performance Method, Expert users are those individuals who can use a system, product or service competently, whereas Novice users are those users who have no familiarity therewith. Novice users, however, undergo a brief training or familiarization process before actual testing occurs in step 117, in which the Expert and Novice user performance of one or more tasks is recorded.

In step 119, the data that is collected and recorded in step 109 and step 117 are compiled, and the appropriate calculations are performed to calculate and elucidate usability performance and usability satisfaction in a quantitative and objective manner. The resulting quantitative information is analyzed (step 121), and recommendations for changes in the system are made accordingly (step 123).

It is understood that FIG. 1, which schematically depicts the steps involved in graphic format, is merely illustrative, and is susceptible to many modifications and adaptations. Note that usability satisfaction and usability performance data can be collected concurrently. Also note that the Usability Performance Indicators Methodology is not explicitly shown in FIG. 1, but is generally included as part of the data compilation and calculation step (i.e., step 119), although as will be further understood below, deriving certain performance indicators may preferably require additional measurements and data acquisition.

The foregoing methodology discussion broadly presents the three models or methods that preferably comprise the usability model of the present invention. The features and advantages of the usability model may further be appreciated in accordance with the ensuing description of preferred embodiments for the Usability Satisfaction Method, the Usability Performance Method, and the Usability Performance Indicators Method.

USABILITY SATISFACTION METHOD

A preferred method of reliable usability satisfaction measurements is the weighted sum of an individual's perception or attitude toward all critical factors influencing a particular task or job function (See supra, Wanous, 1972). Applying this definition of usability measurement, for testing, validating, and otherwise applying the usability model, it is necessary to gather a sample of critical factors for a system. Identifying the critical factors to measure usability of systems is based on determining the critical factors influencing users' abilities to efficiently and effectively operate the system under study. As an example, after careful evaluation of all pertinent factors, using a sample management information system as an example, thirty-six critical factors were identified, and are tabulated in FIG. 4. These factors are the primary basis of usability of this sample computer system. For better statistical analysis of the results, these factors are further divided into four categories: visual clarity of screens, functionality of software, ease of use of software, system messages and help, and system training. Each category indicates an important aspect of the users satisfaction toward the system.

In accordance with an embodiment of the present invention, a preferable, and widely accepted method of measuring users perception or attitude toward a system is the Semantic Differential Technique. This technique was originally developed to measure the meaning of complex concepts (Osgood, C. E., Suci, G. J., and Tannenhaum, P. H., 1957, The Measurement of Meaning, In: *University of Illinois* Press, Urbana, Ill.). The Semantic Differential Technique focuses on appropriate pairs of bipolar adjective pairs for each of the Critical Factors, e.g., "On" and "Off", "Efficient" and "Inefficient", "Good" and "Bad". The bipolar adjective pair consisting of a positive adjective and a negative adjective having opposite semantic meaning. These adjectives are then divided into a seven interval scale. Each of the seven intervals of the scale is further labeled with intensity modifiers.

Adhering to the Semantic Differential Technique, in the example provided, each of the thirty-six critical factors were assigned adjective pairs. An example of bipolar scales measuring "SYSTEM'S OUTPUT TIMELINESS" is shown in FIG. 2. It can be seen from this example that a critical factor may include more than one adjective pair (e.g., two adjective pairs, Fast/Slow and Reasonable/Unreasonable). Further, it is understood that each critical factor may have a different number of bipolar adjective pairs.

System users are asked to mark the applicability of each question. If the Not Applicable answer is marked, then the user does not mark the bipolar adjectives for that question. If the factor is applicable then the user will continue marking the seven interval scales. To quantitatively measure usability of a system, when applying the usability satisfaction algorithm, each of the seven interval scales will be assigned a numeric value from −3 (for the first scale) to +3 (for the seventh scale).

Preferably, there is another scale which measures significance of each critical factor to the users, which ranges from extremely unimportant to extremely important. This significance scale is assigned corresponding values from 0 to 1.0. An example of a significance scale for a factor to a user is shown in FIG. 3. In practicing the Usability Satisfaction Method, then, each identified system user will receive a package consisting of instructions for completing the questionnaire, and the questionnaire. The questionnaire preferably includes for each critical factor: a significance scale, at least one adjective pair scale, and an entry for marking "Not Applicable." For results to be valid and accurate, users should be selected randomly, and a statistically significant sample size should be used. In addition, these users must have enough knowledge of the system being studied to answer the questionnaire.

It is important to note that, if a user chooses the "Not Applicable" answer for a bipolar adjective pair, the user is given the opportunity to respond to its corresponding significance question. This is due to the fact that a Critical Factor may not be applicable to a group of users, but may still be important to them.

The seven interval significance scales are defined in Table 1.

TABLE 1

| Users Significance Scale | |
|---|---|
| Scales: | Degree of Significance: |
| 1 | Extremely Significant |
| 2 | Quite Significant |
| 3 | Slightly Significant |
| 4 | Equally Significant or Insignificant |
| 5 | Slightly Insignificant |
| 6 | Quite Insignificant |
| 7 | Extremely Insignificant |

Usability of a system consists of the sum of its users' feelings or users degree of satisfaction toward the system. Therefore, usability of a system is measured as the sum of users feelings arising from products and services being provided by the system (Bailey, J. E., and Rollier, D. A., 1988, An Empirical Study of the Factors Which Affect User Satisfaction in Hospitals, *Proceedings of the Twelfth Annual Symposium on Computer Applications in Medical Care*).

The following usability satisfaction measurement model governs and reflects this principle.

$$U(i) = \sum_{j=1}^{J} \left[ S(i,j) * \frac{1}{K_j} \sum_{k=1}^{K_j} A(i,j,k) \right] \quad (1)$$

Where:

$$U(j) = \sum_{i=1}^{I} \left[ S(i,j) * \frac{1}{K_j} \sum_{k=1}^{K_j} A(i,j,k) \right] \quad (2)$$

i=User i j=Critical Factor j k=Adjective Pair k

I=Number of users being tested using a system

J=Number of critical factors $K_j$=Number of adjective pairs used for critical factor j ($K_j$>0)

U(i)=User i satisfaction

U(j)=Critical factor j satisfaction

S(i,j)=Importance value of factor j for user i

A(i,j,k)=Answer of user i for adjective pair k of factor j

That is, in order to measure a given user's satisfaction, a weighted sum over the responses to all critical factors is performed for that user. Specifically, for each critical factor j, the importance value is multiplied by the sum of the adjective pair response values for that critical factor, resulting in a user satisfaction value for each critical factor j. To obtain an overall user satisfaction for this given user, then, the user satisfaction values for each critical factor j are summed (i.e., sum over j).

It is also understood that U(j) represents the user satisfaction for critical factor j. That is, U(j) is a weighted sum over the responses for all users for a given critical factor j. It is understood that U(j) and U(j) are only representative of the ways in which the acquired information may be quantitatively represented as a usability satisfaction measure. As discussed above, the critical factors may be grouped into categories (e.g., functionality of software, visual clarity of screens, etc.). Thus, it may be understood that usability satisfaction may be calculated for each category by appropriately summing over the critical factors within an identified category. Similarly, users may be grouped into different categories or types of users, and sums over users within these categories may be performed; for example, either sums of U(i) over a set of users, or a restricted sum over i to calculate a restricted U(j). It is also recognized that an overall usability satisfaction value may be obtained by summing U(i) over all users i, or equivalently, by summing U(j) over all critical factors j. It can be appreciated that in order to facilitate analysis and comparison of the Usability Satisfaction Method output, one skilled in the art may appropriately normalize the various quantities that may be calculated in accordance with the Usability Satisfaction Method of the present invention.

For instance, occasionally, a critical factor is only significant to a few users. Similarly, a given user may not consider all critical factors significant. In such cases, normalization assists analysis of the results for this group of a few users to whom the critical factor is significant. To normalize the results, the data can be normalized within a range of −100 to +100 according to the following formulas:

$$NU(i)=100* U(i)/(3*NF(i)) \quad (3)$$

$$NU(j)=100* U(j)/(3*NF(j)) \quad (4)$$

Where:

NU(i)=Normalized significance of user i
NU(j)=Normalized significance for factor j
NF(i)=Number of factors user i considers applicable
NF(j)=Number of users considering factor j applicable It is understood that in accordance with the Usability Satisfaction Method, the usability of a system pertaining to a critical factor is evaluated by the position of its users on a continuum between a "worst state" and a "best state" for that factor. Therefore, accuracy and objectivity of this model greatly depends on careful delineation of the critical factors comprising the domain of the users satisfaction toward a system.

It is imperative to note that, the Usability Satisfaction Method of the present invention emphasizes a mathematical representation of the relationship between a system and its users. This relationship directly relates to all services and products provided by the system. This relationship is also influenced by policies and other informal rules and regulations governing a system.

As an example of implementing the Usability Satisfaction Method, statistical analysis of each of the categories of critical factors may preferably be presented in a tabular form. For example, the presentation of the Usability Satisfaction Method results may consist of the following format.

| Visual Clarity of Screens: | MIN | AVER | MEDIAN | RANGE |
|---|---|---|---|---|
| Appearance of Sceen | | | | |
| Layout of Info. | | | | |
| Use of Color | | | | |
| Use of Lighting | | | | |

In this table, each entry contains the appropriately normalized value for the usability satisfaction for a category of critical factors, or a critical factor. For example, for the "use of color" critical factor, the minimum value calculated for a given user, the average over all users (i.e., normalized U(j)), the median, and the range are presented. It can be understood, then, that the table clearly represents the quantitative data from the Usability Satisfaction Method such that each critical factor may be analyzed and thus, weaknesses in the system may be quantitatively identified and corrected accordingly. In accordance with the discussion above, a table of all the critical factors may also be included further entries for overall satisfaction, and user satisfaction by categories based on the critical factors and/or users. It is also understood that such a tabular format is merely illustrative of the many ways the quantitative data may be represented, and is not limiting of the Usability Satisfaction Method of the present invention. For instance, graphical representation (e.g., histograms) may be useful. Also, statistical measures of the distribution (e.g., standard deviation) may also be useful.

USABILITY PERFORMANCE METHOD

In accordance with the present invention, a preferred Usability Performance Method (or model) is based on the ergonomics of Human-Machine System principles. These principles analyze the perceptual, cognitive and motor skills of an individual operating a system. According to these principles, a system user's mind operates as an information-processing system and consists of: memories, processors, parameters, and supporting hardware and software. The Usability Performance Model measures the usability performance of a system based on the interaction and interdependency of three primary subsystem: the Perceptual System, the Cognitive System, and the Motor System.

In the Human-Machine System, the Perceptual System receives signals from sensors and related buffer memories. Visual Image Memory is the most significant buffer and is capable of storing important memories and keeping them in a Visual Image Database and an Auditory Image Database.

These two databases maintain the output of the Human-Machine sensory while it is being symbolically coded in the brain. To accurately and quantitatively measure usability of a system, Visual Image Memory characteristics must be realized and analyzed.

Through the Perceptual System, the Human-Machine System detects sensations (activated by the Sensory System) from the environment and transmits them to the human brain. As an example, an end user's Visual System operating a Human Machine System activates the retina of the eyes which is sensitive to light, and registers information from the physical world in the brain.

In the Human-Machine System, the Cognitive System receives the symbolically coded information from the Visual Image Memory Sensors and inputs information onto its Working Memory Processor and activates the users previously stored data from the Visual Image Database, and the Auditory Image Database in the Long Term Memory Processor to actively make decision about how to properly respond.

The Cognitive System simply uses the information maintained in the brain, which was received through the Perceptual System to decide the best possible alternative (decision).

In the Human-Machine System, the Motor System receives the decision from the Cognitive System and carries out the response. Therefore, the decision received from the Cognitive System will be used to activate the Motor System and stimulates a response.

The following mathematical methodology is based on the ergonomics of the Human-Machine System principles which analyzes the Perceptual, Cognitive and Motor Skills of an individual operating a system, and Power Law of Practice (See supra, Snoddy). In this methodology a task is defined as either a single operation (e.g., using a function key F1, or Alt), or a series of operations. As will be further understood herein below, implementing this methodology enables quantitative measurement of the usability of a system's task based on the performance time of a user.

In order to apply the Power Law of Practice, it is critical to clearly define, identify and document the task to be measured as well as the necessary steps a Novice user must follow to successfully complete the task. According to the Power Law of Practice, the time T(i,j) a user takes to perform a task on the jth trial is measured as:

$$T(i,j) = T(i,1) * (j)^{-\alpha} \quad i=1,2,\ldots I \quad (5)$$

$$\overline{T}(i,j) = \overline{T}(i,1) * (j)^{-\alpha} \quad j=1,2,\ldots J \quad (6)$$

For "I" users, and after "J" trials:

$$\overline{T}(i,j) = \sum_{i=1}^{I} \frac{T(i,j)}{I} \quad (7)$$

$$\overline{T}(i,1) = \sum_{i=1}^{I} \frac{T(i,1)}{I} \quad (8)$$

Simplifying the exponential equation (6):

$$\text{Log}\,\overline{T}(i,j) = \text{Log}\,\overline{T}(i,1) - \alpha\,\text{Log}\,j \quad (9)$$

$$\alpha = \frac{\text{Log}\,\overline{T}(i,1) - \text{Log}\,\overline{T}(i,j)}{\text{Log}\,j} \quad (10)$$

Where:

i=ith user j=jth trial

α=Constant

I=Total number of users performing a task

J=Total number of trials

T(i,j)=Performance time of the ith user performing a task for the jth trial

T(i,1)=Performance time of the ith user performing a task for the 1st trial $\overline{T}$(i,j)=Mean or average performance time of "i" users performing a task for the jth trial $\overline{T}$(i,1)=Mean or average performance time of "i" users performing a task for the 1 st trial It is understood that the Power Law of Practice methodology indicates that as a task is repeated, the amount of time required to complete the task is inversely proportional to a power of the number of trials. That is, once the exponent term α is determined, then the amount of time required for a future task may be estimated according to the Power Law of Practice. Further, the Power Law of Practice, if the exponent term α is known for a certain task performed by a particular subject (or by a population of subjects), then the amount of time required for another subject (or the average time for a population of subjects) to perform the task on the jth trial may be calculated according to the Power Law of Practice, using only a measurement of the time required for the latter subject (or population of subjects) to perform a first trial. In accordance with a preferred embodiment of the present invention, usability performance is quantitatively measured according to the statistical significance (e.g., degree of confidence) of the difference between the mean jth trial task completion time for an Expert population and for a Novice population, whereby the mean jth trial task completion time for the Novice user population is calculated according to the Power Law of Practice, using the exponent α value determined from measuring the trial task completion time of the Expert population for a plurality of trials.

Figure 5:
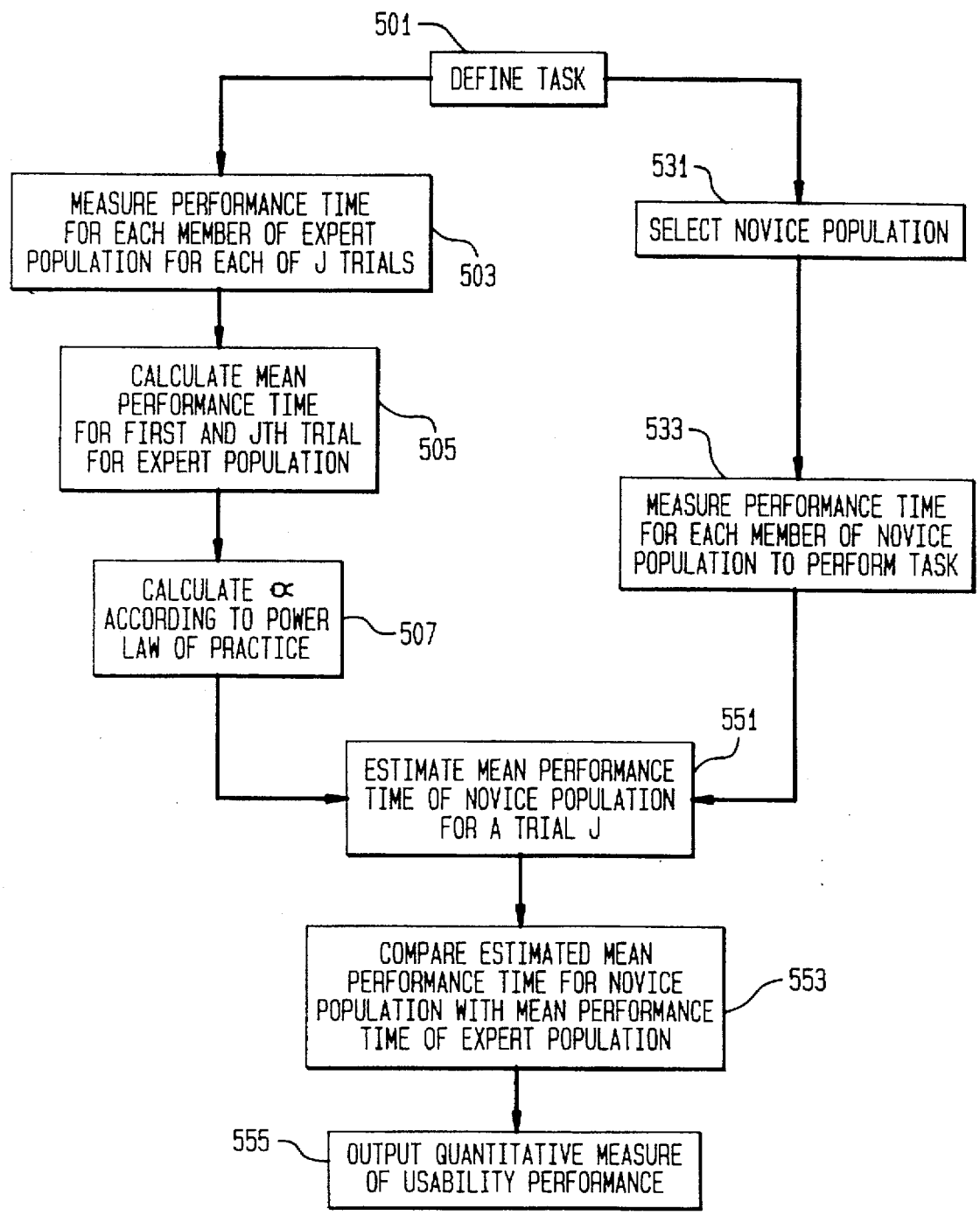
FIG. 5 is an operational flowchart of an exemplary process for implementing a usability performance measurement, in accordance with an embodiment of the present invention.

Referring to the flowchart of FIG. 5, an embodiment of the Usability Performance Method proceeds as described herein below. It is emphasized that the example provided in connection with the description of this method is merely illustrative, for purposes of clarity, and is not limiting of the inventive method. For instance, although specific sample sizes are used in the example, it is understood that the sample sizes used in practice may vary considerably.

First, in step 501, the task (or tasks) to be measured are determined. Then, a number (e.g., 5 to 10) of experienced and well trained users (i.e., Experts) are selected to perform the task for a number of trials (e.g., 5 to 10 trials), and the completion time of the first trial T(i,1), and the jth trial T(i,j) are accurately recorded (step 503) for each Expert user. It is understood that the completion time of each trial may be recorded, but in accordance with an embodiment of the present invention, the completion time for only two trials (i.e., T(i, 1) and T(i,j) for a predetermined value of j) is required.

In step 505, the corresponding average completion time for the first and jth trials (i.e., $\overline{T}$(i,1) and $\overline{T}$(i,j)) for the Expert users are calculated. Then, using equation (9) these average completion time values are used to determine the constant α for the Expert users (step 507). In accordance with the Usability Performance Method, in step 531, a number (e.g., 9) of Novice users are randomly selected. These Novice users are familiarized with the system, and in step 533, are asked to perform the task for the first time, and their respective performance times are carefully recorded.

Next, in step 551, the average first trial performance time for the Novice user population is calculated. Then, using the constant α that was computed for the Expert users in step 507 and equation (6), the average value of the performance time for the jth trial may be estimated for the Novice users (i.e., $\overline{T}$(i,j)). Alternatively, and equivalently, using equation (5) and computed constant α, T(i,j) for each Novice user may be calculated, and then these individual T(i,j) values may be averaged.

In accordance with the present invention, in order to provide a quantitative representation of usability performance, a statistical analysis is performed to compare the performance time of Expert users to that of Novice users. In a preferred embodiment, the estimated mean performance time of Novice users for the jth trial, calculated according to the Power Law of Practice, is statistically analyzed with respect to the measured mean performance time of Expert users for the jth trial. Preferably, statistical inference or hypothesis testing is used according to the Student t-Distribution.

Accordingly, in step 553, hypothesis testing of the model quantitatively and statistically compares the data obtained from Expert, and Novice users. Hypothesis testing may be performed by positing the hypothesis that the mean values of the performance time for the jth trial are equal for the Expert and Novice user populations. That is:

$$H(0): \overline{T}_E(i,j) = \overline{T}_N(i,j) \quad (11)$$

The alternative hypothesis may then be stated as:

$$H(1): \overline{T}_E(i,j) \neq \overline{T}_N(i,j) \quad (12)$$

Where:

$\overline{T}_E$(i,j)=The mean performance time of the jth trial for the Expert user population $\overline{T}_N$(i,j)=The estimated mean performance time of the jth trial for the Novice user population.

H(0)=Null hypothesis

H(1)=Alternative Hypothesis

The probability of rejecting or accepting a true H(0) hypothesis is based on b % significance level of acceptance.

It is this significance level which quantitatively reflects the usability performance of a system. For example, assume that one wishes to know whether the hypothesis is acceptable for a b=5% significance level. This inquiry means that b=0.05 or b/2=0.025 for the two rejection sides (tails) of the t-Distribution, and thus implies that the t values of the two rejection areas for an example where there are twelve degrees of freedom are delineated by the values +2.18, and −2.18 (obtained from the t Probability Distribution Table). It is noted that, as known in the art, the number of degrees of freedom for a population is equal to one less than the number of elements in the population, and that the number of degrees of freedom for the comparison of two populations is equal to the sum of the degrees of freedom for each population.

In accordance with the t-Distribution, under the condition that the standard deviations of the statistics for the respective random variables are unknown, the decision rule may be stated in terms of the t value according to the following equations:

$$t = \frac{\overline{T}_E(i,j) - \overline{T}_N(i,j)}{S} \quad (13)$$

and $$S = \sqrt{\frac{(I_E - 1)S_E^2 + (I_N - 1)S_N^2}{(I_E + I_N - 2)}} * \left(\frac{1}{I_E} + \frac{1}{I_N}\right) \quad (14)$$

$$S_E = \sqrt{\frac{\Sigma [T_E(i,j) - \overline{T}_E(i,j)]^2}{I_E}} \quad (15)$$

$$S_N = \sqrt{\frac{\Sigma [T_N(i,j) - \overline{T}_N(i,j)]^2}{I_N}} \quad (16)$$

Where:

t=The Student t-Distribution, or t-Distribution, test statistic;

$S_E$=Standard Deviation of Expert users $S_N$=Standard Deviation of Novice users S=Standard Error of the Difference Between Means $I_N$=Total number of Novice users $I_E$=Total number of Expert users and generally, the subscripts "E" and "N" refer to Expert and Novice, respectively.

Thus, using these equations, the t-Distribution value is calculated using the recorded values for the Expert and Novice users.

In step 555, this t-Distribution value is used to provide a quantitative output of the usability performance of the system. For instance, if a predetermined confidence level is the basis for the decision, the t-Distribution value is compared to the acceptable range. For example, for the 5% significance level and twelve degrees of freedom discussed above, if the t-Distribution value were greater than −2.18 and less than 2.18, then the hypothesis would be accepted, and the system's usability would be rated for a 5% confidence level of acceptance. If the t-Distribution value did not fall within this range, the system's usability would not be rated highly for a 5% confidence level of acceptance, i.e., the H(0) Hypothesis is rejected. It is understood that once a t-Distribution value is calculated, the confidence level can then be determined according to the t-Distribution, and therefore, that the Usability Performance Method may provide a confidence level of acceptance value as an output that ranges anywhere between 0 and 1 (or, in percentage notation, between 0% and 100%). Alternatively, rather than providing a continuum of confidence levels, the confidence level range may be subdivided (i.e., quantized) into various intervals that are deemed to be indicative of meaningful distinctions in the confidence level. For instance, in the foregoing example, a single confidence level cutoff value (e.g., 5%) is used.

It may be appreciated, therefore, that the Usability Performance Method of the present invention provides a quantitative measure of the usability performance of a system. That is, the confidence level is a quantitative assessment of the usability of a system based on the time required to perform selected tasks, which reflects the required Perceptual, Cognitive, and Motor Skills of an individual operating a system. In effect, the confidence level quantitatively indicates how "intuitive," or "natural" a system is from a users perspective, and thus quantitatively indicates the "user friendliness" of the system, and concomitantly, it indicates the relative difficulty in learning and proficiently using the system.

It should be noted that by applying the Power Law of Practice methodology to the Human-Machine System principle, the usability analysis is performed without requiring more than one trial by each Novice user. Such an approach, as opposed to comparing a measured performance times for both Novice and Expert users for an arbitrary trial, eliminates factors (e.g., improvements in subsequent trials due to learning and other environmental factors) other than those germane to measuring usability. In addition, although the mean value for the first Expert trial may be statistically compared to the mean value of the first Novice trial (i.e., not applying the Power Law of Practice and avoiding learning and environmental factors), based on Human Factors Engineering principles it is preferable with respect to reliability and significance of the results to use the performance times that are measured for an Expert population after the Expert population has performed several trials (note that learning is not a factor for the Expert population). It can be understood that the Power Law of Practice may be applied to the Expert population results as well in order to estimate a mean performance time value for a "j" trial value greater than the number of trials that were performed. However, it is preferable to use an actually measured mean performance time value for the Expert population for a trial subsequent to the first trial.

USABILITY PERFORMANCE INDICATORS METHOD

In accordance with a prefer-red embodiment of the present invention, a usability performance indicator method is included as part of the overall usability method. Usability Performance Indicators provide a quantitative evaluation of a system's usability in four key areas: Goal Achievement, Work Rate, and Operability.

These indicators primarily measure the level of a systems user's performance, e.g. effectiveness, efficiency, productivity, ability, willingness. As described hereinabove, Goal Achievement Usability Indicators measure the degree of success with which systems users perform their tasks and reach their goals. They measure the effectiveness of users operating systems and achieving their objectives.

Work Rate Usability Indicators measure the rate at which systems users perform to reach their objectives. They measure the efficiency and productivity of users operations to perform their tasks.

Operability Indicators measure the ability of system users to utilize the systems features. They measure the capabilities of systems users in making use of their experience, tools, and features to solve their systems problems. They also measure the level of problems users encounter while performing their jobs.

These indicators (Rengger, R. E., 1991, Measuring System Usability, *Proceeding of the 8th International Conference on Systems Engineering*, Conventry, United Kingdom) assist the measuring effectiveness, efficiency, productivity and other highly important usability indicators. In accordance with an embodiment of the present invention, the following indicators may be employed.

GOAL ACHIEVEMENT USABILITY INDICATORS $$NE = \frac{1}{100} (QU*QL) \qquad (17)$$

$$EE = \frac{1}{100} (QU*QL) \qquad (18)$$

Where:
- QU=Required inputting steps or information (e.g., pages, signals, screens, production units, pulses, etc.) during performance of a task, i.e., quantity of steps input by a user.
- QL=Number of quality steps required to perform a task
- EE=Expert user effectiveness
- NE=Novice user effectiveness It is understood that in order to accomplish a particular task, or series of tasks, a certain number of steps are necessary (e.g., as prescribed by a user manual). This number of steps is represented by QL. Notably, QL for a Novice may be greater than QL for an Expert because an Expert may have knowledge about the system which allows the Expert to perform the task with fewer steps than may be prescribed by a manual, for example. Ideally a user will perform these steps in succession, performing no additional steps, and concomitantly, making no errors in performing a step. However, due to problems or errors, a Novice or an Expert using the system to accomplish a task will perform QU number of the required steps. For instance, a Novice may request help (constituting a step), or may undertake one or more steps that are not required or may be completely extraneous. It is understood then, that QU is generally greater than QL, and that the optimum effectiveness occurs when QU is equal to QL, corresponding to a minimum value of NE or EE.

WORK RATE USABILITY INDICATORS $$RE = \frac{NE}{EE} * \frac{NT}{ET} \qquad (19)$$

$$PP = \frac{NT - PT - LT}{NT} \qquad (20)$$

$$PT_t = QU_t - QL_t \qquad (21)$$

Where:
- $QL_t$=Time required for a Novice or an Expert to complete the required number of steps in the task, i.e., perform all QL steps
- $QU_t$=Time required for a Novice or an Expert to complete the task, i.e., perform all QU steps
- $PT_t$=Problem Time: the time period a Novice user spends performing steps not required for performing the task, i.e., $QU_t$ and $QL_t$ are for a Novice
- NT=Novice user task time (e.g., equivalent to $QU_t$ for a Novice)
- ET=Expert user task time (e.g., equivalent to $QU_t$ for an Expert)
- PP=Novice user productivity period
- LT=Novice user learning time
- RE=Relative efficiency of a Novice user in comparison to an Expert user It is understood that the relative efficiency represents the ratio between a Novice user efficiency and an Expert user efficiency, where the efficiency is defined as an effectiveness-time product (e.g., EE*ET) and thus, the value of RE is greater than or equal to one, with a value of one indicating the system is ideal with respect to work rate usability, i.e., a Novice can effectively perform a task in the same amount of time as an Expert performing the same task. Also, the Novice user productivity period, PP, represents the fraction of the total Novice user task time that actually is spent by the Novice user in performing steps that achieve the task. In this respect, the learning time represents any time required for the Novice become familiar with the system in order to perform the task. Also note that it may be desirable to present these indicators in percentage form.

$$RT = \frac{PT}{ET} = \frac{QU - QL}{NT} \qquad (22)$$

$$RU = \frac{PU}{NA} \qquad (23)$$

$$RL = \frac{PT - UP}{PT} \qquad (24)$$

$$CF = \frac{CA}{NA} + \frac{LT + TP}{NT} \qquad (25)$$

Where:
- RT=Relative number of Novice user problems per unit of time
- RU=Relative number of Novice user problems per unit of task
- PT=Number of Novice user problems encountered
- PU=Number of Novice user problems per unit of task
- NA=Number of actions Novice user has undertaken to complete a task
- RL=Problem recovery level for a Novice user
- UP=Number of unsolved problems a Novice user has encountered during Novice task time
- CF=Complexity factor of the Novice user
- CA=Number of calls for assistance a Novice user made during Novice task time
- TP=Novice user problem time (e.g., $PT_t$ for a Novice)

In accordance with Operability Indicators measuring the ability of users to utilize the system features, it may be understood that, as defined, the RT indicator measures the ratio between the additional steps a Novice user performs that are not required for performing a task and the time required by a Novice to complete the task. Alternatively, such an indicator may be represented by the ratio of $PT_t$, to ET, i.e., fraction of time spent on problems. Note that for RU, which is the number of problems encountered per number of actions taken, NA in many instances is equivalent to QU, depending how tasks and actions are defined. That is, an "action" may be defined for convenience based on the system analyzed: an "action" may be defined as a number of tasks; alternatively, a task may be defined as multiple actions; or an "action" may be the equivalent of a "task". Using two variables QL and NA emphasizes that the indicators may be defined for convenience of analysis. Also, note that the number of problems encountered may include any combination of the following: the number of times a user requested help, the number of times a user perceived that a problem was at hand, the number of times a user suspended activity for greater than a predetermined period of time, the number of extraneous steps executed on the system, etc.

It may also be understood that the recovery rate, RL, represents the fraction of problems encountered that the Novice user successfully solved or overcame. In addition, the complexity factor provides an index of the overall difficulty in using the system based on the relative number of calls for assistance and the relative amount of time spent learning the system and addressing problems encountered as opposed to the time performing steps to complete the task. Finally, it may be desirable to present these Operability Indicators in percentage form.

It is understood that the foregoing usability performance indicators are merely illustrative of the indicators that may be employed in accordance with measuring the performance (e.g., time, number of steps) of a given task. In addition, indicators may be derived as functions of the above indicators. For example, since it is useful to compare NE to EE for a given task, it may be preferable to define a relative effectiveness as the ratio of NE to EE. It is noted that the usability model of the present invention preferably includes the indicators associated with the Usability Performance Indicators Method; however, since each of the methods disclosed herein (i.e., Usability Satisfaction Method, Usability Performance Method, and Usability Performance Indicators Method) provides complementary and independent quantitative usability information, it may not be necessary to include the Usability Performance Indicators Methodology as par-t of the overall usability method. Nevertheless, since much of the data needed to provide these indicators is acquired in accordance with the Usability Performance Method, determining the indicators requires little additional effort. Moreover, as stated, these indicators provide complementary analytical information.

With the present usability method, as described above, system usability is quantitatively measured in accordance with three complementary methods. Such a usability methodology will effectively enhance re-engineering efforts. In addition, the methodology provide, a diagnostic information process for root cause evaluations of a system's usability, assesses or ranks a system's capabilities to meet its purported objectives, and identifies appropriate courses of action for current problem areas as well as those problem areas that may be encountered during future development. Results achieved by using this methodology are quantitative, cross-platform, applicable, cost effective, repeatable, consistent and easily validated.

TASK ANALYSIS AND RE-ENGINEERING

In accordance with the present invention, a Task Analysis and Reengineering process may be practiced in connection with the usability method. As disclosed hereinabove, the usability model quantitatively measures satisfaction according to critical factors (factors significant to use of a system) and evaluations of task trials. After a system's usability is measured, the Task Analysis and Re-engineering process is used to quantitatively perform task evaluation, and recommend re-engineering improvements and identify specific courses of action. A feature of the Task Analysis and Re-engineering method is that it utilizes methods that objectively and quantitatively analyze a system's tasks, thus further exploiting the quantitative and objective attributes of the usability method. In accordance with practicing the Task Analysis and Reengineering model of the present invention, a paradigm is provided for determining which tasks require improvements, and determining how to re-engineer the tasks that require improvements. Prior to describing the Task Analysis and Re-engineering model, it is useful to clarify the use of several terms as they are used in the context of the model. These terms include: "tasks", "task goals", "task analysis", "re-engineering", and "usability re-engineering".

Tasks is a job function describing a sequence of single activities. It consists of one or more activities which describe meaningful units of work and having precise beginnings and endings. Thus, in a work cycle period of time it is possible to concisely determine the number of tasks being performed to obtain the desired result(s).

Task goals, in terms of usability, pertain to listing the results that the users may desire to achieve while using a system. Identifying task goals requires analyzing and evaluating each of system's tasks and actions, and improving user's performance and effectiveness.

Task analysis is defined as a process that identifies what the users are attempting to accomplish operating the system, breaks user's performance into unit tasks and actions, recommends improvements and assists analysts in initiating plans that improves the (targeted) task. Task analysis, in accordance with the present invention involves enhancing the usability of a system, listing user's goals for performing each task, evaluating the results, quantitatively analyzing each task, and recommending reengineering remedies accordingly.

Re-engineering is synonymous with quality, and task improvements through change. The re-engineering process has three primary requirements: basic changes to achieve excellence; top-down support and cross-organizational improvements; and quality consciousness as an integral part of a work environment.

Usability Re-engineering in the usability context depends on the principle that all users of a system—not only managers, must be involved in every aspect of planning, redesigning, and implementing improvement at all levels. The implementation stage has to start at the process level, e.g., planning, products or services, marketing, accounting, invoicing, purchasing. At each process, the steps to follow are to: simplify the work; chart the flow of work; perform sensitivity analyses; and recommend remedies to the task problems.

In the ensuing description of the present invention, discussion of task analysis and re-engineering is addressed in terms of the usability model. In the usability model, the usability of a system pertaining to a critical factor is evaluated by the position of its users on a continuum between a "worst state" and a "best state" for that factor. As may be appreciated from the hereinabove description of the usability model, the usability model emphasizes a quantitative representation of the relationship between a system and its users. This relationship relates directly to all services and products provided by the system. It may be understood that this relationship is also influenced by policies and other informal rules and regulations governing the system.

Within the purview of the Task Analysis and Re-engineering model of the present invention is quantitatively analyzing a system's tasks, and providing reengineering solutions. The Task Analysis and Re-engineering Method of the present invention is preferably based on each of the methods included in the usability model, including the Usability Satisfaction Method, the Usability Performance Method, and the Usability Performance Indicators Method.

As may be appreciated by one skilled in the art, an effective task analysis methodology involves listing the task's goal(s). With this list, the objective is to reach the system's goal(s), and end result(s). Such an objective translates into a problem of determining which factors and tasks should be changed (e.g., task analysis), and how they should be changed (e.g., re-engineering).

To perform task analysis of a system, therefore, analysts preferably need a checklist to guide them through the process. Such a checklist is preferably compatible with, and based on the system's critical factors. Following the checklist will greatly help analysts in task analysis and re-engineering efforts. In accordance with the present invention, by way of example, such a task analysis checklist should include items which relate to:

Goals of the system which clearly and simply indicate the system's goals and objectives.

Tasks which concisely define and list each task, their actions, and concisely indicate goals of the tasks and their actions. This list (checklist) is used for evaluating user's interactions and performance with the system as they strive to achieve goals of specific tasks and their functions. A check list should contain the definitions of the task and its actions. For the task and each action the check list should also contain a subject, an exact beginning and ending, clearly defined and well-documented goals.

Task characteristics which identify distinctive actions of a task required to achieve its' goal(s), these actions including: inputs and outputs, e.g., types of information going in and results coming out; operational procedure, e.g., application of a systematic approach to achieve a goal; decisions points, e.g., what, how and when to start a task; and tools required, e.g., hardware, software and environment.

Task dependency, which is defined as the relation of a task to other tasks, and circumstances needed to achieve the goal(s) of the task. Thus, task dependency items include: relations to others, e.g., other tasks' dynamics and interdependencies; other task significance, e.g., influences of other tasks; concurrent effects, e.g., sequence of events impacting the task; availability of actions, e.g., promptness of a task's actions of their attainability when necessary; and flexibility of actions, e.g., ability of tasks and their actions to adapt to technological, software, hardware and environmental changes when required.

Task applications, which relate to specific uses of a task and their implementations to achieve the task's goal(s), and include identifying: sequence of actions, e.g., steps to follow; frequency of actions, e.g., regularity of actions; and action relationships, e.g., relation of a particular action to other actions.

Flexibility, which relates to the user's ability to control, determine, and obtain the expected results from the task, and include factors such as: speed, e.g., timeliness of the task's results; priority, e.g., the preferential rating of a task; and procedure, e.g., sequence of actions to follow.

Demands which relate to expectations from the task, e.g., results, and include identifying: physical factors, e.g., hardware; perceptual factors, e.g., impressions, influences; environmental factors, e.g., the circumstances or conditions a task is under; and safety and health, e.g., human factors and safety conditions surrounding a task's environment.

To objectively and quantitatively analyze a task, analysts need to study problems that arise while users are performing a task. These problems are usually related to such factors as: equipment deficiencies, missing resources, overloads, interruptions, surrounding changes, policy changes. For example, equipment deficiencies may be that the equipment does not meet the performance target; does not meet specifications; or has a high failure rate. Missing resources may include information, materials, personnel, and support. Overloads may result from limited resources, high expectations, or both. Interruptions may include: process breakdowns; missing tools, information, etc.; restarting the system. Surrounding changes may be related to physical, environmental, social, and political changes. Also, policy changes may include changes in: laws and regulations, standards, and technology.

In accordance with the present invention, characteristics, problems, and generally all identified factors of a system are measured according to a usability method for a population of users (e.g., Novices or Experts, or both). Such factors are preferably organized in a "top-down" or hierarchical manner. For example, a given factor may have "sub-factors," and some of these sub-factors further may have second-order factors, etc. Similarly, measured users may be classified according to "sub-populations" based on myriad factors or characteristics. Task analysis is conducted by comparing population statistics with sub-population statistics, comparing factor statistics for a population with sub-factor statistics for the population, comparing population statistics for a critical factor with sub-population statistics for a critical factor, or by analogous statistical comparisons for various overlapping classifications of populations (sub-populations) and factors (subfactors). Similarly, task analysis may be performed by population and factors according to functions of quantities associated with usability performance as well as usability performance indicators. The following description of the task analysis and re-engineering method of the present invention as applied to the Usability Satisfaction Method, Usability Performance Method, and Usability Performance Indicators Method, by way of example, is demonstrative of the features and advantages of the present invention which may also be realized by application of the present Task Analysis and Re-engineering Method to any quantitative and objective measures of usability.

TASK ANALYSIS OF THE USABILITY SATISFACTION METHOD

In accordance with the Usability Satisfaction Method of the present invention, task analysis may be performed according to satisfaction by user, and satisfaction by factor. Furthermore, in accordance with the Task Analysis and Reengineering model, for each of these assessments of usability satisfaction, task analysis and re-engineering may be performed according to: population, critical factors, a critical factor, vital critical factors, or other demographic groups. Thus, it may be appreciated that the Task Analysis and Re-engineering model according to the present invention includes a method based on the Usability Satisfaction Model. Accordingly, a method for task analysis and re-engineering according to an embodiment of the invention includes: implementing the Usability Satisfaction Model; and either performing task analyses and re-engineering according to user satisfaction, or performing task analyses and reengineering according to factor satisfaction, or performing task analyses and re-engineering according to a combination of both user satisfaction and factor satisfaction.

More specifically, it is understood from the hereinabove description, that the Usability Satisfaction Model produces the weighted sum of user's perceptions or attitudes toward critical factors impacting a specific task. A comprehensive questionnaire is developed to collect user's answers. To measure usability, the user's responses are then transformed into satisfaction by user [e.g., U(i)], and satisfaction by critical factor [e.g., U(j)]. Preferably, if a critical factor is significant to a few users, the model normalizes the results within a range of −100 to +100 by applications of two formulas NU(i), and NU(j), which represent normalized significance of user i, and factor j.

The results obtained from the Usability Satisfaction Model provide a wealth of information and instructions for further interpretation of the data. For instance, as discussed above, the data obtained from the usability model may be grouped into the following categories: population, critical factors, critical factor category, and vital critical factors. Preferably, the information obtained from the above categories may be presented as a table of minimum, average, and maximum values that correspond to unsatisfactory, normal, or acceptable values. For a task that requires further study, or for more important tasks, analysis is preferably performed by measuring users' satisfactions with a set of vital critical factors, which are factors that have greatest impact on users who are operating the system. It is also possible to perform task analysis with respect to other demographic users' groups: for example, gender, age, experience, and training.

Note that task analysis results reflect only user's perceptions of the factors that affect their performance. Users interact with information systems as though their perceptions are correct. Those perceptions, whether correct or not, are used to analyze a task and its actions. For each task, the analysts must continuously and thoroughly ask whether the task is applicable, necessary, user friendly, cost effective, efficient, or in need of re-engineering. Care must be given to ensure unbiased results by randomly sampling users and ensuring their anonymity. To users, a task is only a tool that helps or hinders their job performance. Criteria such as: availability, flexibility, and responsiveness are critical to the success of a task from the users' points of view.

The result of this task analysis process identifies the factors with which users are experiencing frustration and difficulties while performing a task. Through careful analysis of the users' answers, analysts are able to determine possible root causes of the users' problems with the task. Dissatisfaction with terminal response time, for example, might cause poor task designs. Other factors that may cause poor task designs include, for example, insufficient computer memory, inadequate, communication lines, poor job scheduling, or high expectations. Conclusions presented in this task analysis should, therefore, be viewed as problem indicators for potential re-engineering remedies.

By way of example, in the usability model, the sample critical factors influencing a task or a system are divided into seven groups: screens-visual clarity, software-functionality, software-ease of use, system messages or helps, system training, system output, and a user's environment. Precise usability data received from the model enables analysts to analyze and rank usability of a system's tasks. Results to the Usability Satisfaction -model indicate whether there are problems with a task. If there are inherent problems with a task, then the model assists the analysts to initiate a plan to solve the problems. Users' performance of a task is always influenced by a set of unique critical factors. Identifying, sorting, and studying the users responses to these unique critical factors assists analysts in further re-engineering a task. It is important to note that the task analysis process is based on users' satisfaction of a task, usefulness of critical factors to a task (factor satisfaction), or a combination of the two.

USER SATISFACTION

With respect to users' satisfaction, task analyses by population are measurements of U(i) values for various users' groups, e.g., districts, regions, projects, and experience. The results are computed, compared, analyzed, tabulated, and reengineering recommendations are made. The tabulated results are illustrated in terms of their minimum, average, maximum, and range values.

More specifically, to compute the minimum, average, maximum, and range values, an upper control limit (UCL) and lower control limit (LCL) are defined according to the average over the U(i) values and the standard deviation of the U(i) distribution. For a large number of users, the distribution should approximate a normal distribution, and the empirical rule of control limits may be used, with a significance level associated with the upper and lower control limits according to the number of standard deviations from the mean used to define UCL and LCL. That is, variance for sample size "T" for a distribution in U(i) is given by:

$$S^2 = \frac{1}{T-1} \sum_{i=1}^{T} [U(i) - \overline{U}(i)]^2 \tag{22}$$

When "T" is large, and the distribution is normally distributed, the UCL, and the LCL values for b % significance level are UCL and LCL may be defined according to:

$$UCL = \overline{U}(i) + cS \tag{23}$$

$$LCL = \overline{U}(i) - cS$$

where S is the standard deviation of the U(i) distribution according to the defined variance, and c is a positive constant, and its value depends on the significance level, b %. Thus, the maximum range, minimum range, average, and range for the U(i) distribution is determined accordingly. Then, for each population or group (i.e., a subset of the population), the minimum, average, maximum and range are computed according to similar calculations as those for determining these quantities for the entire U(i) distribution. FIG. 6 displays an example of this analysis by users' groups. It is understood that the variance formula above includes a factor of "T" which corresponds to the total number of values of "i" for each respective variance calculation, and which accounts for the different sample sizes with respect to the overall population such that the respective variances may be compared with significance.

The degree of users' satisfaction toward a task is the basis for its utility, and the degree of its re-engineering efforts. If users' satisfaction of a task falls within the minimum category, then the analyst has to refer to the questionnaire's answers to indicate whether the task is applicable or not. Low task's applicability may influence the analysts' decision to eliminate, re-engineer, or combine two or more compatible tasks.

Conversely, if the task's applicability is high, then, the analyst has to find out why users' satisfaction is too low, and to develop effective re-engineering methods that improve their satisfaction. If the applicability is average, the decision has to be made to whether re-engineer, enhance it, or a combination of the two. When there are significant differences in the users' satisfaction, there may be a need for an in-depth study of the differences.

Task analysis by critical factors categories is measurement of U(i) values for various critical factors categories, e.g., screens-visual clarity, screens-consistency, system output, software-functionality, software-ease of use, system messages or help system training users' environment. U(i) values are computed for each category, and tabulated in terms of minimum, average, maximum and range.' The results are then compared, analyzed, and reengineering recommendations are provided. FIG. 7 is an example of average users' satisfaction with the seven categories tabulated. FIG. 7 more clearly illustrates the utility of such analysis. The minimum, average, maximum and range values for the population are entered at the top of each column. The results from the analysis for each critical factor category are then entered in each row. Comparison of these values among critical factors, and with respect to the values for the entire population indicates critical factors, and thus tasks, which are candidates for reengineering. For instance, critical factors may be ranked according to range, as shown in the "rank" column of FIG. 7. Factors with the higher rank (e.g., smaller values rank number, corresponding to the larger values of range) are identified as better candidates for re-engineering than those with lower rank.

It is appreciated that, within the purview of the present invention, such a method may further be implemented for each critical factor wherein each critical factor may be associated with "sub-critical" factors, also referred to as "critical factor categories". In this way, the root task or critical factor may be isolated. Re-engineering of such a root task may then be effectuated, followed by further task analysis to ascertain the effect of the re-engineering. It may be appreciated that such a top-down, systems approach provides a paradigm, and is an effective method, for targeting the reengineering of myriad systems or products.

As stated, task analysis by a critical factor category is U(i) measurements for a specific critical factor category, e.g., screens-visual clarity. The values are tabulated, compared, analyzed, and re-engineering recommendations are thereby provided. FIG. 8 exhibits the minimum, average, maximum, and range of the screens visual clarity category.

Task analysis by vital critical factors is U(i) measurements for a selected number of factors that significantly impact a task. The analysis is very effective, and essential for tasks that are primarily dependent on a few critical factors (vital factors). For example, assuming a task depends on the system's speed, error recovery, hypertext, and eye strain factors, the process computes U(i) for these vital factors, then tabulates and analyzes the task. FIG. 9 illustrates the analyses of the example.

Task analysis by demographic groups is U(i) measurements for any other segment of the users' population, e.g., gender, age, income. This type of analysis is useful when dynamics of users are evaluated for improving their performances, e.g., quality, or efficiency. A table for gender (Females and Males) with respect to task analysis by population, for example, is similar to FIG. 9 to the extent of providing a further level of task analysis.

FACTOR SATISFACTION

Factor satisfaction task analysis is based on the U(i) measurements. This type of analysis evaluates usefulness of critical factors to a task, and discusses their contributions to the users. The process depends on the U(j) formula, of the Usability Satisfaction Model. When the critical factors are only significant for a few users, preferably the process is represented in terms of NU(j). It is understood, therefore, that the upper and lower control limits are based on a distribution' for U(j), and can be represented as:

$$UCL = \bar{U}(j) + cS \quad (24)$$

$$LCL = \bar{U}(j) - cS$$

With respect to factor satisfaction, task analysis by population is U(j) measurements for various users' groups, e.g., districts, regions, projects, males, females, etc. The results are tabulated in terms of minimum, average, maximum, and range statistics similar to FIG. 6. This type of task analysis is exhibited by an example in FIG. 10 for the regions.

Task analysis by critical factor is U(j) measurements for various categories, e.g., screens-visual clarity, screens-consistency, system output, software-functionality, software-ease of use, etc. The results are then tabulated similar to FIG. 7.

Task analysis by a critical factor category is U(j) measurements for a category, e.g., system training. The analysis is based on comparisons, and evaluations of the tabulated results, tabulation of the results similar to FIG. 8. An example of this type of task analysis is illustrated in FIG. 11 for the Systems Training category.

Task analysis by vital critical factors is U(j) measurements for factor that are vital to successful completion of a task. Tabulation of the results is similar to FIGS. 9 and 10. An example of this type of task analysis is shown in FIG. 12 for various vital critical factors.

Task analysis by other demographic groups is measurements of U(j) values for segments of the users' population that may enhance the analysts' capabilities to analyze a task, e.g., education, income, age. As an example FIG. 13 shows task analysis based on users' education.

TASK ANALYSIS FOR THE USABILITY PERFORMANCE MODEL

Task analysis of the Usability Performance Model is a quantitative approach of measuring usability of tasks based on the ergonomics of the Human Machine principles. The methodology compares performance of Expert users with Novice users as they complete a task. Task analysis for the Usability Performance Model includes: executing the Usability Performance Model, performing task analysis based on performance record, and performing task analysis and re-engineering based on action time.

As discussed hereinabove, the Usability Performance Model measures usability of systems by interaction and interdependency of the three primary Human Machine subsystems: the Perceptual System; the Cognitive System; and the Motor System. The Usability Performance Model is based on the ergonomics of the subsystems, and the Power Law of Practice. In the Usability Performance Model, a task satisfies the definitions discussed above, and can either relate to a single operation (e.g., using a function key F1, or Alt), or a series of operations (e.g., navigating through screens, or changing the windows). The Usability Performance Model provides a constant a for a number of Expert users performing a task, which is then used to determine T(i,j) for Novice users. Test of hypothesis for a b % significance level enables a comparison between the average performances of Novice users and Expert users to indicate whether the average performance time of the Novice-users falls within an acceptable region. As will be further appreciated, the Usability Performance Model also assists analysts to perform task analysis, and recommend re-engineering solutions.

PERFORMANCE RECORD

Task analysis by the performance record (performance time) measures and compares performances of the Expert and Novice users, and defines whether the Novice users' performance fall within an acceptable region or not. The task analysis by performance record attempts to determine whether the process of performing a given task is logical, and whether a task's mechanized process compares favorably, and measures accurately; the user's manual process or unmechanized process. The method tests the ability of Novice users to perform a task while applying the mechanized process provided by the system.

In accordance with the present invention, the Task Analysis and Reengineering based on performance record of the Usability Performance Model uses the T(i,1) value determined for the Novice users and assigns an average performance record to it.

Percentage of a task the ith Novice user completed may be defined as:

$$R(i) = \frac{P(i) * \alpha}{T(i,1)} \quad (25)$$

and for "T" Novice users:

$$\overline{R}(i) = \frac{1}{T} \sum_{i=1}^{I} R(i) \quad (26)$$

where:

R(i)=Performance record of the ith Novice user

P(i)=Performance time of the ith Novice user for successfully completed actions in a task, according to predetermined standards.

$\overline{R}(i)$=Average performance record of the Novice users

α=Constant, computed by for Expert users according to Usability Performance Method The measurement R(i) indicates work performance rate of a task as represented by the percentage of the task Novice users are able to complete. It may be appreciated that the constant a provides a factor that accounts for task-to-task variations in usability performance, as accounted for by Expert users. In accordance with the Task Analysis and Re-engineering Method of the present invention, the performance record is represented in terms of control limits in order to tabulate, or otherwise represent, the information for direct analysis.

Variance for "T" number of Novice users is $$S^2 = \frac{1}{T-1} \sum_{i=1}^{I} [R(i) - \overline{R}(i)]^2 \quad (27)$$

When "T" is large, and the distribution is normally distributed, the UCL, and the LCL values for b % significance level are $$UCL = \overline{R}(i) + cS \quad (28)$$

$$LCL = \overline{R}(i) - cS$$

where "c" is a positive constant, and its value depends on b %. In general, the significance level assumes 31.74%, or 4.46%, or 0.26% values, for "c" equal to 1, or 2, or 3 respectively.

Task analysis by performance record may be performed, for example, by population. The analysis is done for various users' groups, e.g., districts, regions, projects, genders, etc. Results are evaluated with other task characteristics, and reengineering recommendations are formulated.

The results are tabulated similar to FIG. 6 of the task analysis of the Usability Satisfaction Model. As an example, FIG. 14 is an illustration of task analysis by population for various projects.

ACTION TIME

Task analysis by action time divides and evaluates the time Novice users spend on performing a task for the first time. The action time highlights the setup time, and the overall action item determined according to the time per action item. The T(i,1) values used in this part of the methodology are the same as the previous ones in the Usability Performance Model. However, this analysis focuses on the number of actions each Novice user goes through to perform a task for the 1st time, and the related time, then analyzes the results. Accordingly, T(i,1) may be expressed as:

$$T(i,1) = P(i) + S(i) + \sum_{k=1}^{N(i)} A_k(i) \quad (29)$$

and $$\overline{T}(i,1) = \frac{1}{T} \sum_{i=1}^{I} T(i,1) \quad (30)$$

Where:

T(i,1)=Performance time of the ith user operating a task for the $1^{st}$ trial $\overline{T}$(i,1)=Average performance time of the "T" users operating a task for the 1st time S(i)=Set-up time for the ith user N(i)=Number of unsuccessful actions the ith Novice user performs $A_k$(i)=Time per specific unsuccessfully completed action for user i As before, variance for "T" number of Novice users is:

$$S^2 = \frac{1}{T-1} \sum_{i=1}^{I} [T(i,1) - \overline{T}(i,1)]^2 \quad (31)$$

When "T" is large enough, and the distribution is normally distributed, the UCL, and the LCL values for b % are given by:

$$UCL = \overline{T}(i,1) + cS \quad (32)$$

$$LCL = \overline{T}(i,1) - cS \quad (33)$$

where c is a positive constant that depends on b %. As before, in general the significance level assumes 31.74%, or 4.46%, or 0.26% values, for "c" equal to 1, or 2, or 3.

As an example, the average performance time of "T" users operating the system for the first time is computed for a task presented in the table shown as FIG. 15. In this case a task is being tested by 6 Novice users, and 3 mechanized (system's requirements) action items. The 24 minutes represents the average performance time of 6 Novice users performing a task for the first time.

Task analysis for action time by population is similar to the previous cases and computes the T(i,1) values for the Novice users performing a task. The analysis is developed for various users' groups, e.g., districts, regions, projects, genders, etc. Results are evaluated with other task characteristics, and re-engineering recommendations are formulated.

TASK ANALYSIS BY USABILITY PERFORMANCE INDICATORS

In accordance with the present invention, methods of analyzing a task based on various performance indicators is also provided. Task analysis according to these indicators enhances the above described task analysis methods by addressing other inherent technical problems of systems, e.g., effectiveness, productivity, efficiency, capabilities.

Similar to the previous section of the document, analysts can enhance their task analysis efforts by using the indicators to evaluate all or a group of users. The analysis could be performed for: population, critical factors, a critical factor, vital critical factors, and other demographic groups. To prevent redundancy, this section only discusses the population group. For other groups, the analysis Tables and methods for their generation are similar to the previous two sections.

It is understood that Usability Performance Indicators are mathematical relationships that determine how well users perform a task, and measure the capabilities of users achieving the system's goals. It is important to note that Usability Performance Indicators are in percentage or fractional form. Thus, minimum, average, and maximum values may be represented differently from those of task analysis for usability satisfaction and task analysis for performance indicators.

Task analysis by population is measurements of the indicators for various users' groups, e.g., districts, regions, etc. To objectively analyze a task, there is a need to state whether the results of the indicators fall within the minimum, average, or the maximum range of acceptability. This range of acceptability corresponds to: unacceptable, average, or acceptable. FIG. 16 displays an example of this type of analysis for a "specific" indicator, and for users of various educational backgrounds.

In accordance with the foregoing description of the Task Analysis and Reengineering Method of the present invention as applied to the usability model, task analysis may be based is on various practical forms addressing: task analysis by usability, task analysis by indicator, and task re-engineering. The Task Analysis and Reengineering Method, therefore, preferably provides analysts with simple tables to analyze a task objectively and quantitatively.

According to the Task Analysis and Re-engineering Method of the present invention as applied to the usability model the importance of each method of the usability model is considered, and tabulation of the respective analysis is preferably provided for a clear understanding of a specific task, thus assisting analysts in their re-engineering efforts. It is critical to note that the task analysis methods of the present invention practiced in accordance with the usability measurement methods of the present invention effectively analyze a task from different points of view. In combination, they provide the analysts a conclusive, thorough, and comprehensive tool for performing task analyses.

It is also important to note that the re-engineering discussions of a task must be addressed after careful analysis of a task, and are documented as an enhancement to the task analysis's effort. All re-engineering solutions should be based on the task analysis' computations, if considered, they must improve usability of a system.

It is also understood from the foregoing that the Task Analysis and Re-engineering Method addresses two significant issues: how to present task analysis in simple tabulated forms, and how to re-engineer a task to increase usability of a system? Answers to both of these questions are clearly given in the following manner.

First, task analysis by usability form is computing and tabulating usability results for: U(i), U(j), R(i), and T(i,1) measurements. For a system's task, the analysts record their usability results and determine re-engineering recommendations to improve the system. FIG. 17 is an example of a presentation of this form.

Another effective way to perform task analysis is computing and tabulating the task's indicators, and analyzing the results. The table of FIG. 18 is preferably used for analysts to indicate their results for each of the indicators and to clearly evaluate the answers.

Task re-engineering is an important part of improving usability of a system, and is performed after task analysis. Throughout the foregoing description, reengineering has been discussed as an enhancement to task analysis, or as an integral part of task analysis. It may be appreciated that the distinction is only one of perspective, and in the current discussion re-engineering techniques are presented as independent of task analysis. Both of these techniques depend on the evaluation of the users' responses to the Usability Satisfaction Questionnaire.

If, in the Usability Satisfaction Method, the majority of users' responses to a critical factor is "Not Applicable" and important (or extremely important) in the significance scale, the critical factor is a candidate for re-engineering the system. The method to follow is to prioritize these types of critical factors based on the users' average responses to the significance scales, and systematically recommend re-engineering solutions for each critical factor. FIG. 19 illustrates a sample presentation of the method.

In this table the average rate is the average rate of the users' responses to a critical factor for the significance scale of the questionnaire. The priority of a critical factor depends on how close the average rate is to 7 (extremely important). The reengineering recommendation(s) should be concise, pertinent to the critical factor, and state which task(s) will primarily be impacted.

Applicable but not important are critical factors or functions that are part of the system but are not important based on users' responses to the questionnaire (e.g., applicability, and significance scale). Similar to the previous method (i.e., FIG. 19), the method should also indicate critical factor, average rate, priority task(s) impacted, and re-engineering recommendations.

TASK ANALYSIS BY TIME SCHEDULING AND TIME ESTIMATING

In accordance with the present invention, the Task Analysis and Reengineering Method may further be applied to provide new task analysis methods according to what may genetically be referred to as "traditional" methods of task analysis. Three such methods are described hereinbelow. It may be appreciated that these methods assist analysts to analyze a task and its activities from a different perspective. These methods include: activities in nodes (AIN), including Bar Charts and Milestones; and activities on arrows (AOA), including Network diagrams. These techniques analyze a task's activities by portraying their time schedule and their interdependencies. In the ensuing description of these task analysis methods according to the present invention, for each of the three methods described, first the conventional use of these methods is described followed by the application of the present invention to such methods for evaluating a task and it's activities.

BAR CHARTS

According to conventional use, Bar Charts, often called Gantt Charts, divide a task into various activities with a specific planned duration. These are Primarily AIN types of charts. Bar charts are frequently used to analyze a task by scheduling task activities in order of their use.

Figure 20:
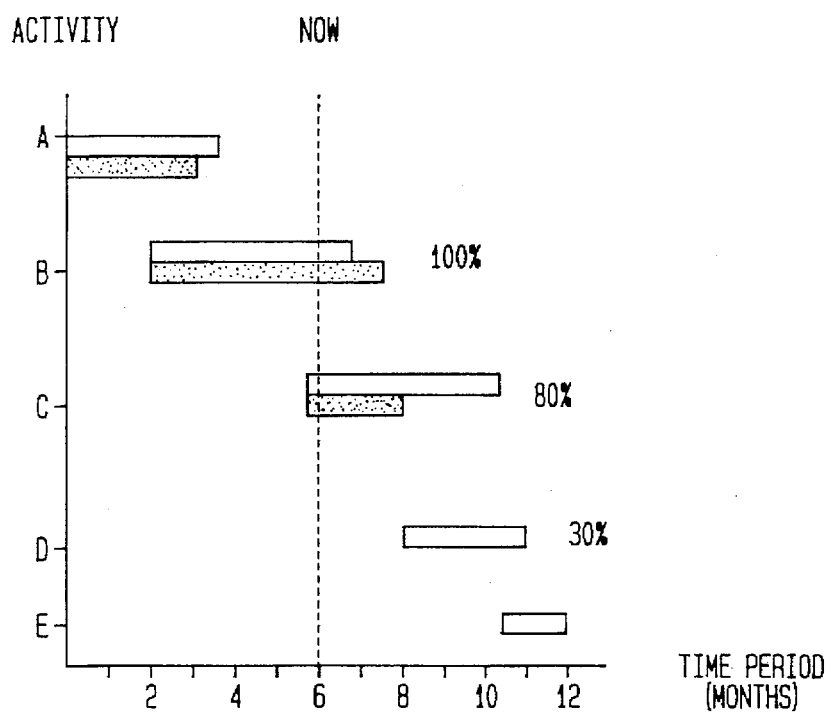
FIG. 20 illustrates a sample Bar Chart for use in accordance with the Task Analysis and Re-engineering Method of the present invention.

Referring to FIG. 20, a task is divided into activities with their computed planned duration (e.g., according to the present invention, by using the methods of the usability model). The Bar Chart represents the planned time span of a task and each of its activities. The chart also shows the task and status of its activities. The shaded bars represent the forecasted or computed span of the activities as of the end of an agreed time dimension, e.g., hour, day, month, etc.

The above sample Bar Chart (FIG. 20) divides a task into five open activities or bars. In this example, when the Bar Chart was constructed, five open bars or activities were drawn to represent the planned time span for each activity. The chart also shows project status at the end of the sixth month. For more detailed analysis of the task's activities, the time duration of the activities could further be divided into smaller time units, e.g., weeks, days, etc.

Activity A was completed early. Activity B is forecasted to be finished half a month late. Activity C is forecasted to end approximately a month and a half early. The percentage of completion for each activity in process is also illustrated. Activity A has been completed; activity B is 80% complete; and C is 30% complete. As this Bar Chart illustrates, analysis of a task and its activities are simple to perform, easy to understand and modify. They show graphically which task activities are ahead or behind schedule.

In accordance with the present invention, task analysis may be performed according to Bar Chart Analysis based on the usability model. Task time is computed using the task and its activities, this time is then compared with the time obtained from the Performance Model $\overline{T}(i,j)$, that is the average performance time of "I" users performing a task for the jth trial. The time value from the Bar Chart for the task should always be greater or equal to the $\overline{T}(ij)$. If not, then the Bar Chart time value for the task must be further analyzed and revised.

MILESTONES CHARTS

Milestone Charts are also AIN charts. A Milestones Chart task analysis notes a few key activities of a task (milestones) on a calendar Bar Chart. Milestones are defined in various ways, but they probably are best known as activities or events clearly verified as significant to the completion of task. These could be determined from the careful study of a task.

Figure 21:
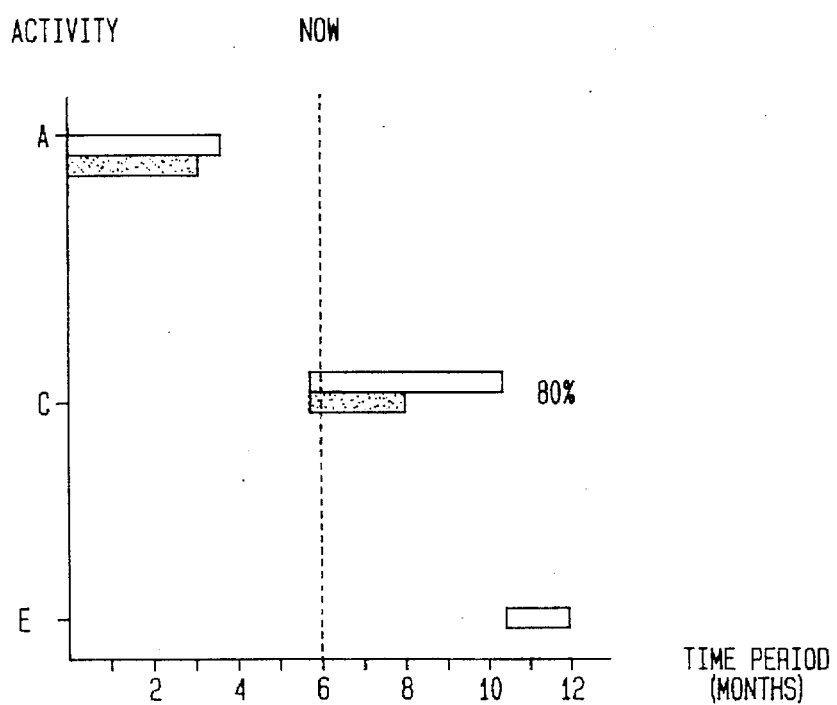
FIG. 21 illustrates a sample Milestones Chart for use in accordance with the Task Analysis and Re-engineering Method of the present invention.

When milestones are defined, analysts list them as part of their analysis to update progress of a task. Presentation of a Milestones Char-t task analysis is similar to the Bar Chart, but instead of all the activities (Bar Chart), a Milestone Chart only analyzes the key activities. FIG. 21 illustrates, by way of example, the Milestone task analysis of the Bar Chart example (FIG. 20) for key activities & C and E.

Milestones' Charts are effective methods of evaluation a task and its activities by illustrating, highlighting and analyzing time values of the key activities. Milestones Charts are similar to the Bar Charts and the analysis is identical. Task time is computed by summing up the task's key activities, then this time is compared with the time obtained form the Performance Model, $\overline{T}(i,j)$, that is average performance time of "I" users operating a task for the jth trial. The time value for the task should always be greater or equal to the $\overline{T}(i,j)$. If not, then the Milestones Chart time value for the task must be further analyzed and the task activities should be recalculated.

NETWORK DIAGRAMS

Network Diagram techniques are very effective tools in planning and analyzing activities of a task. There exist numerous network techniques that can be used for analyzing a task. Unfortunately most of them are too theoretical for typical systems or are not applicable. A practical technique, referred to herein as the Bahador Network Analysis Technique (BNAT) has been developed by the present inventor that is well suited for myriad systems. BNAT is event oriented (that is, the event labels go in the arrows of the diagram) and typically has been used when the time for each activity is uncertain.

As stated, there are many forms of Network Diagrams techniques available that can be used for task analysis, e.g., Program Evaluation and Research Technique (PERT), Critical Path Method (CPM), shortest Route Method (SRM). Unfortunately, most of these techniques are cumbersome and are not applicable to various systems. In the present discussion, therefore, Network Diagram analysis, and particularly Activity on Arrow (AOA) types, is summarized and simplified here in a description of BNAT.

The BNAT type of task analysis was developed by the author to provide analysts with a simple and concise method of illustrating a task's activities, computing the minimum time required to finish a task (CT), and the CT's corresponding sequence of activities (CP).

Figure 22A:
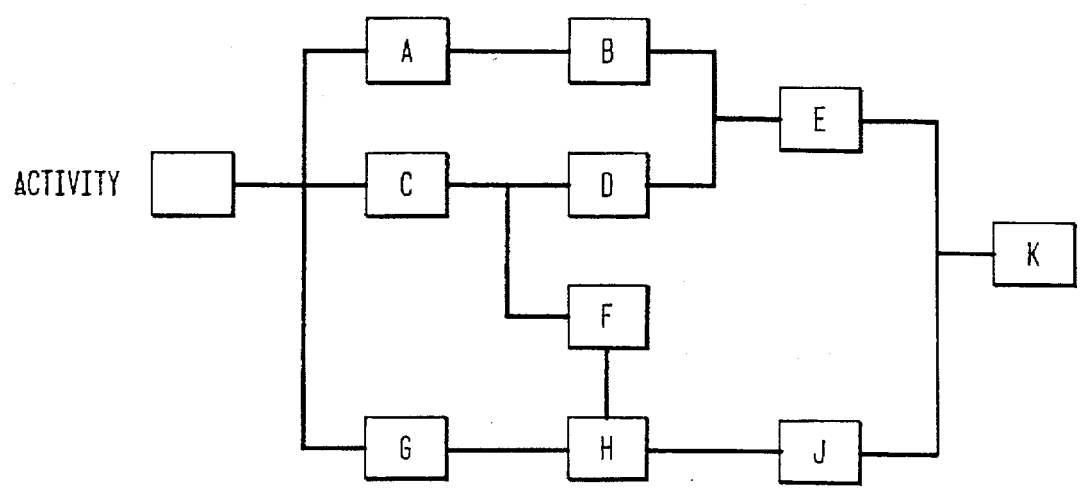
FIG. 22A and FIG. 22B illustrate an Activity in Node (AIA) and Activity on Arrow (AOA) network, respectively, for use in accordance with the Task Analysis and Re-engineering, Method of the present invention.
Figure 22B:
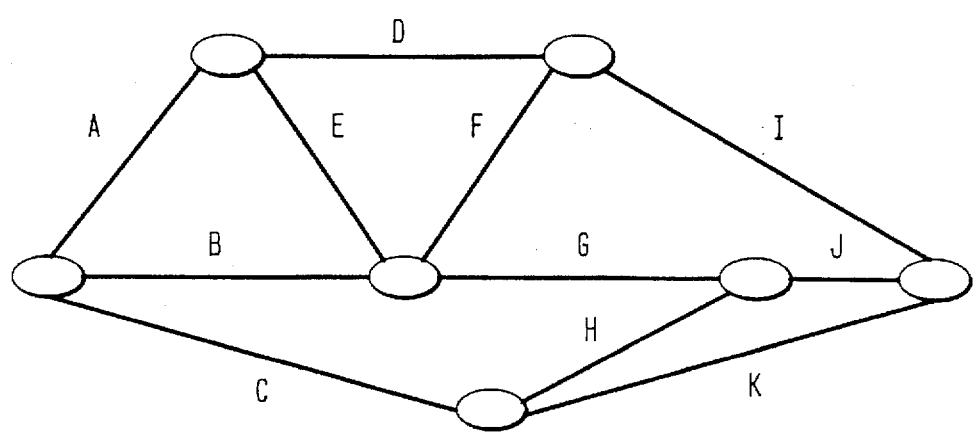

Analysis of a task depends on how activities are processed and their sequence with respect to each other. A network diagram consists of various displays that link a task's activities with one another to display interdependencies. A single activity could have interdependencies with predecessor, successor, and concurrent activities. FIGS. 22A and 22B illustrate the primary types of network diagrams: activity in node (AIN), and activity on arrow (AOA). Activity in node (AIN) types are similar to the Bar Charts and the Milestones Charts, which are discussed hereinabove.

Activity on arrow (AOA) charts are similar to BNAT Charts and are useful tools to analyze a task. Although AOA and BNAT type of networks are similar, the methods employed are different. The BNAT method analyzes a task and its activities by measuring times estimates of each activity. The BNAT method is as follows:

$$T_o \leq T_m \leq T_p \tag{34}$$

Where:

$T_m$=The most probable activity time $T_o$=The optimistic activity time $T_p$=The pessimistic activity time $T_e$=The expected time for an activity To analyze a task, the $T_e$ values for each activity must be computed to determine the Critical Time (CT) of a task and the Critical Path of a task (CP). Critical Time (CT) is the minimum expected time that users can finish a task and the Critical Path (CP) is the path(s) that represents CT for sequence of activities. CT is therefore, a summation of the sequence of activities on the CP. To determine the CT of BNAT, an analyst must: (i) clearly illustrate the BNAT network and identify all the activities and their corresponding time values; (ii) identify all paths (sequence of activities) beginning from the start to the end positions; (iii) compute the total time value of each path; (iv) find the path(s) with the greatest time value, and earmark the path or paths as CP; and (v) identify the time associated with the CP as the CT.

It is important to note that there always is one CT value, but there could be more than one CP in a BNAT network.

$T_e$ of an activity may be computed according to:

$$T_e = \frac{T_o + 4T_m + T_p}{6} \quad (35)$$

For example, an activity with: $T_o=2$ hours, $T_m=3$ hours, and $T_p=6$ hours yields:

$$T_e = \frac{2 + 4(3) + 6}{6} = 3.333 \quad (36)$$

Figure 23:
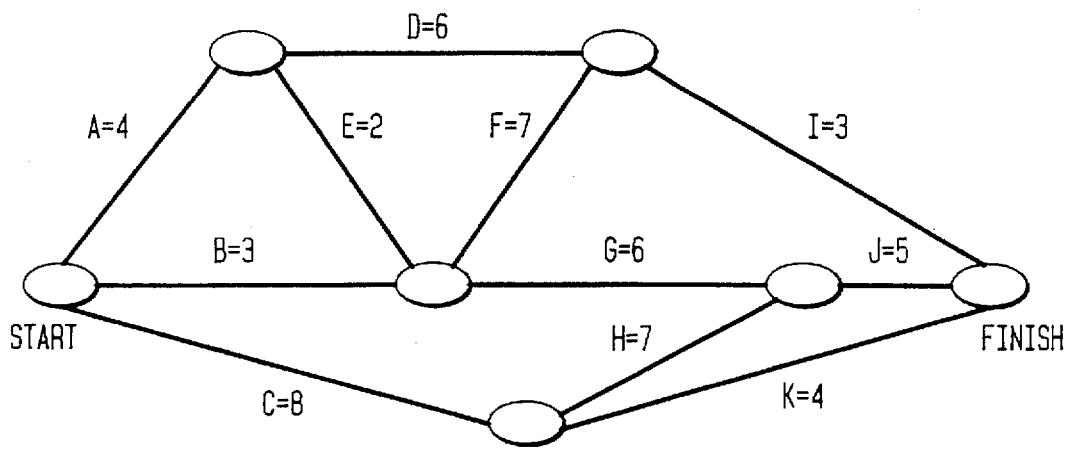
FIG. 23 is an example of an Activity on Arrow (AOA) network for use in accordance with the Task Analysis and Re-engineering Method of the present invention.

After the $T_e$ of each task activity is computed, then the CP and the CT of the task are determined. The best way to identify the CP, and to determine the CT is exemplified in the FIG. 23, in which the values indicated on the network are $T_e$ values, i.e., $T_e$, for activity F is 7 Hours. The first step in analyzing the task is to determine the CP of the network. To determine the CP of the network, all paths of the network and their corresponding time values must be identified (FIG. 24). A path is a sequence of activities from start to finish and the corresponding time of a path is summation of the path's activity time values. The CT=20 Hours represent the minimum time required to finish this task successfully, and the CP=C-H-J represent the key activities to study to reduce the CT. If the CT is greater than expected, then the analysts must analyze the CP activities to eliminate delays and bottlenecks. In this example, to reduce the CT, the analysts should concentrate on the CP, or activities C, H and J. If it is decided to reduce any or all of these activities, then new CP and CT values should be determined.

In accordance with the Task Analysis and Re-engineering Method of the present invention, Network Diagram techniques (such as the described BNAT) may be supplemented in accordance with the usability model of the present invention, thereby providing an improved method for task analysis and re-engineering. This analysis is similar to the one for the Bar Charts and the Milestones Charts. The CT should be compared with the time from the Performance Model $\overline{T}(i,j)$, average Performance time of "T" users operating a task for the jth trial. The CT value from the BNAT for the task should always be more or equal to the $\overline{T}(i,j)$. If not, then the CT value and the activities on the CP have to be further analyzed and evaluated.

It may be appreciated therefore, that applying the Usability Performance Model of the present invention to provide Task Analysis by Time Scheduling and Time Estimating pertains to computing the $\overline{T}(i,j)$ (i.e., average applying performance time of "T" users operating a task for the jth trial), then applying one or all of task analysis techniques (e.g., Bar Charts, Milestone Charts, Network Diagrams, etc.) to analyze a task and its activities. Thus, according to the Task Analysis and Re-engineering Method of the present invention, a methodology is provided which includes the steps of: selecting a task; identifying the task's activities and each activity's characteristics, including time and dimension values and sequence and interdependencies; computing a task's $\overline{T}(i,j)$ value; determining task time according to other task analysis techniques; and comparing the time value from other task analysis techniques to the time according to $\overline{T}(i,j)$.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope.

For example, with respect to the Usability Satisfaction Method, as described above, in accordance with the present invention there are numerous ways to categorize and represent the user sampled critical factor data. Further, in the Usability Performance Method, different methodologies, other than the Power Law of Practice, may be used for representing practice by an individual. Also, in appropriate circumstances, a different test statistic or even different population statistics may be employed. Moreover, many different combinations of the above described usability indicators, as well as additionally defined indicators, may be used.

In addition, the Task Analysis and Re-engineering method of the present invention may be applied to any objective and quantitative measure of usability, and is therefore not limited to the usability method described hereinabove. Further, the factors and tasks identified hereinabove, and their hierarchy, is only an example of factors and tasks associated with a system, and are by no means limiting or otherwise restrictive. It is also understood that the tabular presentation of the results of this analysis is only for convenience and by way of example. One skilled in the art recognizes that there are myriad tabular and/or graphical methods for presenting such results.

These and other changes can be made without departing from the spirit and the scope of the invention and without diminishing its attendant advantages. It is therefore intended that the present invention is not limited to the disclosed embodiments but should be defined in accordance with the claims which follow.

I claim:

1. A method for task analysis and re-engineering of a system, said system including means for performing a task, said task including at least one step, said method comprising the steps of:

measuring usability of said system to provide quantitative measurements of said task for a population of users, wherein the quantitative measurements include a time characteristic that is computed by converting time segments into a digital performance time, and a satisfaction characteristic of the users;

determining a population statistical index for a set of said population according to values based on said quantitative measurements, wherein the population statistical indexes are based on the variance between said quantitative measurements;

determining a comparable statistical index for each of a plurality of subsets of said set of said population;

processing said comparable statistical index for the plurality of subsets to identify a feature for re-engineering.

2. The method according to claim 1, wherein at least one of said subsets of the population further includes a plurality of additional subsets, and further comprising the step of determining an additional subsets statistical index for the plurality of additional subsets.

3. The method according to claim 1, wherein said quantitative measurements provide the satisfaction of the group of users with respect to a critical factor.

4. The method according to claim 1, wherein said quantitative measurements provide a satisfaction of a given user with respect to a set of critical factors.

5. The method according to claim 1, wherein said step of measuring the usability of the system includes the steps of:

identifying critical factors for said system;

identifying at least one bipolar adjective pair for each critical factor, said bipolar adjective pair consisting of a positive adjective and a negative adjective having opposite semantic meaning;

acquiring adjective pair data from each member of a system user population for each said bipolar adjective pair, said adjective pair data for each bipolar adjective pair having a numerical value within a range bounded by a first value assigned to said positive adjective and a second value assigned to said negative adjective and linearly related to a characteristic of the positive adjective relative to a characteristic of the negative adjective of said critical factor according to the member;

acquiring significance data from each member of said system user population for each said critical factor, said significance data numerically representing the relative significance of said critical factor according to the member; and generating a usability satisfaction value according to said adjective pair data and said significance data.

6. The method according to claim 5, wherein said usability satisfaction value includes a sum of said product for each critical factor for a given user.

7. The method according to claim 5, wherein said usability satisfaction value includes a sum of said product for each user for a given critical factor.

8. The method according to claim 1, wherein said step of measuring usability includes generating at least one usability performance indicator according to measured parameters.

9. The method according to claim 1, wherein said system is a computer system.

10. The method according to claim 1, wherein said step of measuring usability includes the steps of:

acquiring first data for measuring usability satisfaction according to a set of critical factors of said system;

acquiring second data for measuring usability performance according to the difference between performance time for an Expert population and a Novice population to perform a task;

acquiring third data for measuring a usability performance indicator;

processing said first, second, and third data to provide quantitative values for said usability satisfaction, said usability performance, and said Usability Performance Indicator.

11. The method according to claim 1, wherein the population and comparable statistical indexes are based on control limits.

12. The method according to claim 1, wherein the population and comparable statistical indexes are based on range of the values for each said plurality of subsets.

13. The method according to claim 1, further comprising the step of ranking the features according to the population and comparable statistical indexes.

14. A method for task analysis and re-engineering of a system, said system including means for performing a task, said task including at least one step, said method comprising the steps of:

identifying activities of the task and characteristics of each of the identified activities, the characteristics including time, sequences, and interdependencies, wherein the time characteristic is computed by converting time segments into a digital performance time value;

computing an average performance time value for each of a plurality of novice users performing the task for one of a plurality of trials;

computing an average performance time value for each of a plurality of expert users performing the task for one of a plurality of trials by using a different task analysis technique;

comparing the average performance time value of novice users with the average performance time value of expert users to compute a system average performance time value; and outputting a measure of the system average usability performance value indicating the confidence level of novice and expert users acceptance.

15. The method according to claim 14, wherein said different task analysis technique is an activities in nodes method.

16. The method according to claim 14, wherein said different task analysis technique is an activities on arrows method.

17. The method according to claim 14, wherein said different task analysis technique is a Bar Graph method.

18. The method according to claim 14, wherein said different task analysis technique is a Milestone Chart method.

19. The method according to claim 14, wherein said different task analysis technique is a Network Diagram method.

* * * * *

UNITED STATES PATENT AND TRADEMARK OFFICE
CERTIFICATE OF CORRECTION

PATENT NO. : 5,724,262
DATED : March 3, 1998
INVENTOR(S) : Bahador Ghahramani

It is certified that error appears in the above-indentified patent and that said Letters Patent is hereby corrected as shown below:

At column 1, line 14, delete "s"

At column 3, line 5, delete "articularly" and insert therefor --particularly--

At column 3, line 66, delete "according," and insert therefor --according--

At column 4, line 60, delete "according," and insert therefor --according--

At column 5, line 33, delete "according," and insert therefor --according--

At column 11, formula 3, that portion of the formula reading "*$NY$" should read --*$NF$--

At column 16, line 49, delete "prefer-red" and insert therefor --preferred--

At column 16, lines 51 - 53, delete "Usabili-tyPerformanceIndicator-sprovide aquantitativeevaluationof asystem's" and insert therefor --Usability Performance Indicators provide a quantitative evaluation of a system's--

At column 19, line 33, delete "par-t" and insert therefor --part--

At column 23, line 53, delete "-model" and insert therefor --model--

At column 24, line 67, delete "range.' " and insert therefor --range.--

At column 25, line 54, delete "U(i)" and insert therefor --U(j)--

At column 28, line 21, delete "T(i,1) = " and insert therefor --$\overline{T}(i,1)$ = --

At column 31, line 31, delete "$\overline{T}(ij)$" and insert therefor --$\overline{T}(i,j)$--

UNITED STATES PATENT AND TRADEMARK OFFICE
CERTIFICATE OF CORRECTION

PATENT NO. : 5,724,262
DATED : March 3, 1998
INVENTOR(S) : Bahador Ghahramani

It is certified that error appears in the above-indentified patent and that said Letters Patent is hereby corrected as shown below:

At column 31, line 46, delete "Char-t" and insert therefor --Chart--

At column 31, line 50, delete "&" and insert therefor --A,--

At column 32, line 24, delete "(CT)" and insert therefor --Critical Time (CT)"--

At column 32, formula 34, which reads as follows: $T_o \leq T_m \leq T_p$
should read -- $T_o \leq T_m \leq T_p$ --

At column 32, line 53, delete "Critical Time (CT)" and insert therefor --CT--

At column 32, line 47, delete "$T_m$" and insert therefor --$T_m$--

At column 36, line 2, delete "on range" and insert therefor --on a range--

Signed and Sealed this

Fourteenth Day of July, 1998

Attest:

BRUCE LEHMAN

*Attesting Officer*    *Commissioner of Patents and Trademarks*